United States Patent [19]

Suda et al.

[11] Patent Number: 5,422,700
[45] Date of Patent: Jun. 6, 1995

[54] CAMERA IN WHICH FOCUS IS DETECTED TO A PLURALITY OF VIEWFIELDS WITHIN A OBSERVATION BLOCK WHICH IS SELECTED BY VISUAL AXIS DETECTING MEANS

[75] Inventors: Yasuo Suda, Yokohama; Akihiko Nagano, Kawasaki; Kazuki Konishi, Tokyo, all of Japan

[73] Assignee: Canon Kabushiki Kaisha, Tokyo, Japan

[21] Appl. No.: 314,442

[22] Filed: Sep. 28, 1994

Related U.S. Application Data

[63] Continuation of Ser. No. 200,561, Feb. 22, 1994, abandoned, which is a continuation of Ser. No. 865,042, Apr. 3, 1992, abandoned.

[30] Foreign Application Priority Data

Apr. 5, 1991 [JP] Japan ................... 3-073130

[51] Int. Cl.6 .......... G03B 3/00; G03B 29/00; G03B 13/36
[52] U.S. Cl. .......... 354/402; 354/410; 354/62; 354/219
[58] Field of Search ........... 354/400, 62, 219, 402, 354/403, 410

[56] References Cited

U.S. PATENT DOCUMENTS

| | | | |
|---|---|---|---|
| 4,574,314 | 3/1986 | Weinblatt | 354/400 X |
| 4,954,701 | 9/1990 | Suzuki et al. | 354/406 X |
| 5,036,347 | 7/1991 | Tsunekawa et al. | 354/400 |
| 5,151,583 | 9/1992 | Tokunaga | 354/466 X |
| 5,182,443 | 1/1993 | Suda et al. | 354/219 X |
| 5,239,337 | 8/1993 | Takagi et al. | 354/219 X |

FOREIGN PATENT DOCUMENTS

| | | |
|---|---|---|
| 58-142306 | 8/1983 | Japan . |
| 59-107313 | 6/1984 | Japan . |
| 60-101513 | 6/1985 | Japan . |
| 63-18314 | 1/1988 | Japan . |
| 1241511 | 9/1989 | Japan . |
| 1288816 | 11/1989 | Japan . |
| 232312 | 2/1990 | Japan . |

*Primary Examiner*—Russell E. Adams
*Attorney, Agent, or Firm*—Fitzpatrick, Cella, Harper & Scinto

[57] ABSTRACT

A camera in which focus is detected for a plurality of viewfields within a selected observation block includes observation structure for observing an object therethrough, and visual axis detecting structure for detecting the position of the visual axis of an observer's eye. A plurality of observation blocks are defined, each block having a plurality of detection viewfields. Structure is provided for selecting one of the blocks in accordance with a result of the detection of the visual axis detecting structure. Focus detection circuitry is provided for performing a focus detection operation with respect to the detection viewfields which are included within the selected observation block. Circuitry is also provided for forming a focus adjustment signal for an objective lens on the basis of the detection information of the focus detection circuitry regarding the detection viewfields of the selected observation block.

8 Claims, 23 Drawing Sheets

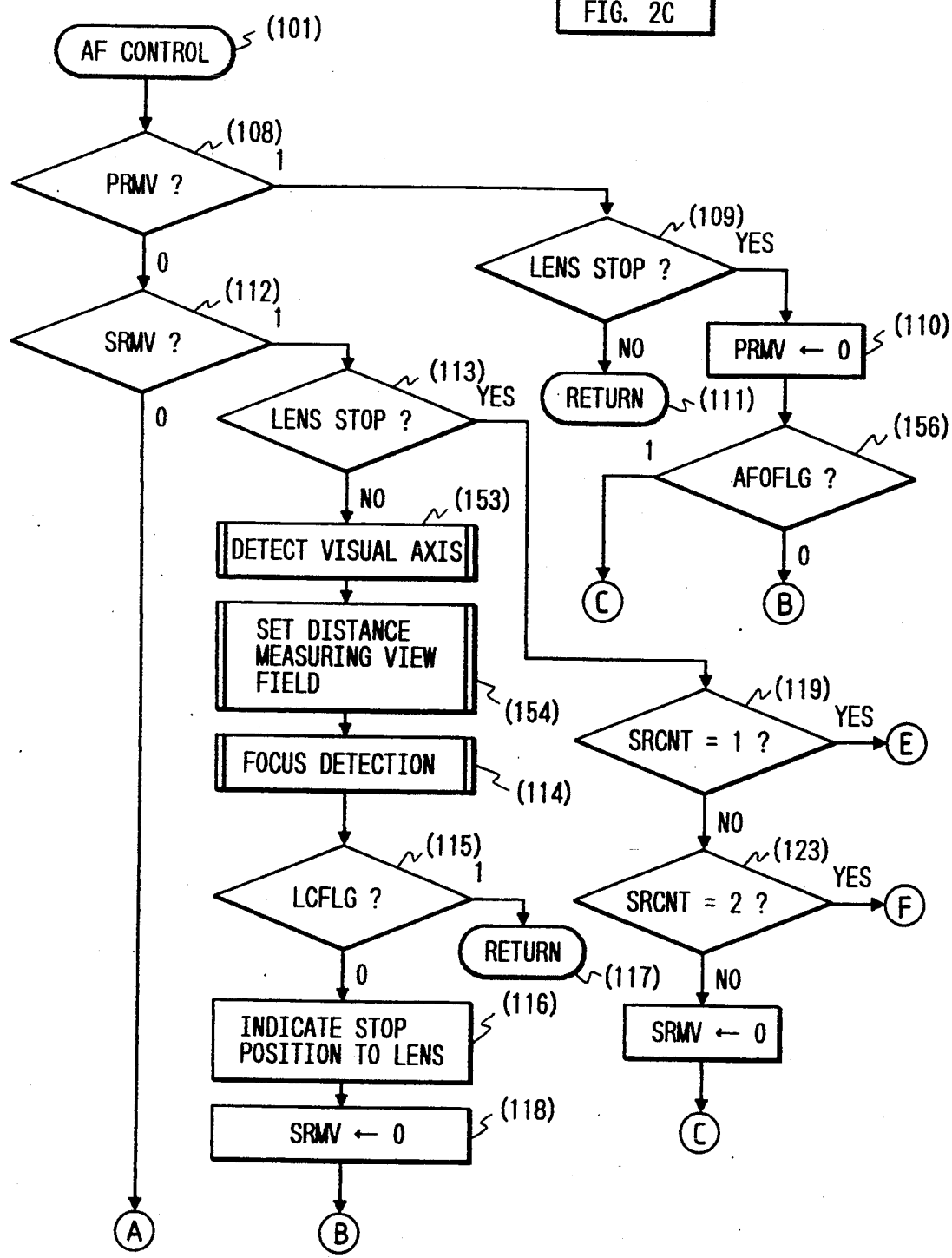

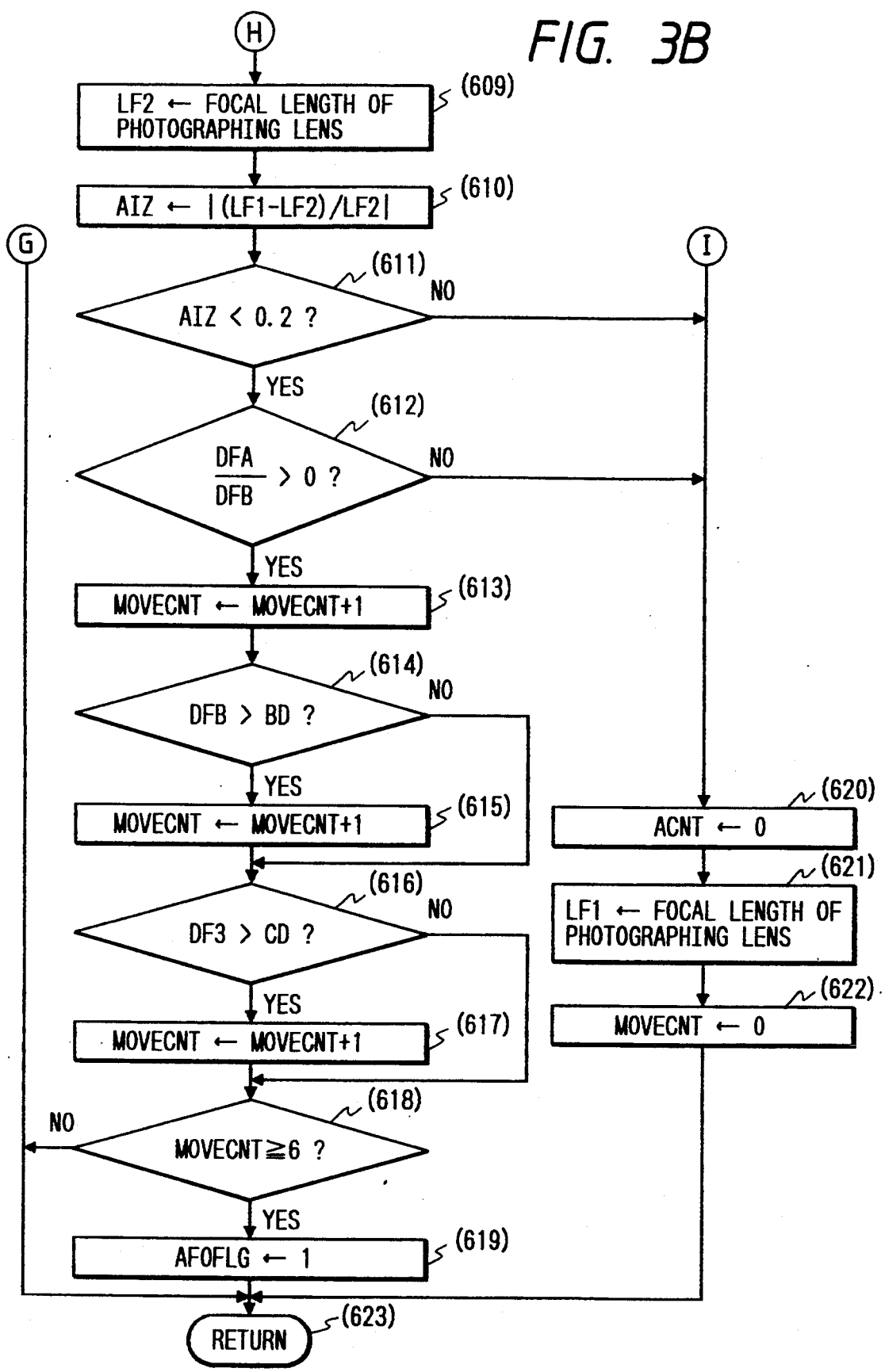

FIG. 8

| FIG. 8A |
|---------|
| FIG. 8B |

FIG. 8A (401) CHANGE DETECTION POINT (402) AFP = 0 ? — NO →

YES ↓

(403) V1 ← (DF2+DL1−DF1)/TM1
(404) V2 ← (DFA+DL2−DF2)/TM2
(405) VA ← |V1−V2|
(406) V3 ← (DFC+DL2−DF2)/TM2
(407) VC ← |V1−V3|
→ (K)

(413) AFP = −1 ? — NO →

YES ↓

(414) V1 ← (DF2+DL1−DF1)/TM1
(415) V2 ← (DFB+DL2−DF2)/TM2
(416) VB ← |V1−V2|
(417) V3 ← (DFC+DL2−DF2)/TM2
(418) VC ← |V1−V3|
→ (L)

(425) V1 ← (DF2+DL1−DF1)/TM1
(426) V2 ← (DFA+DL2−DF2)/TM2
(427) VA ← |V1−V2|
(428) V3 ← (DFB+DL2−DF2)/TM2
(429) VB ← |V1−V3|
→ (M)

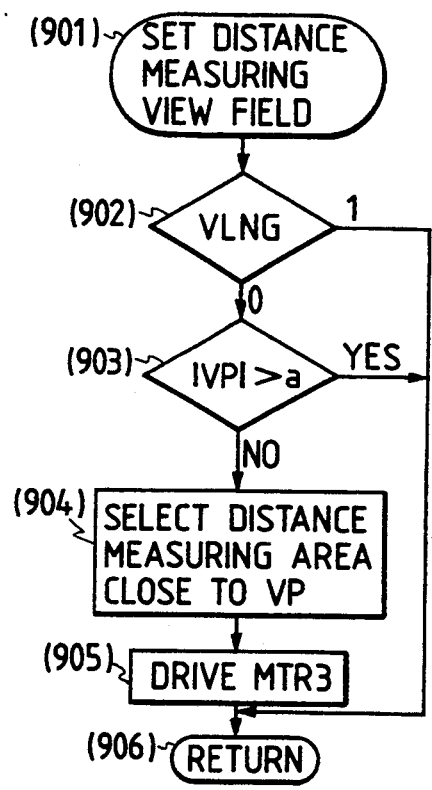
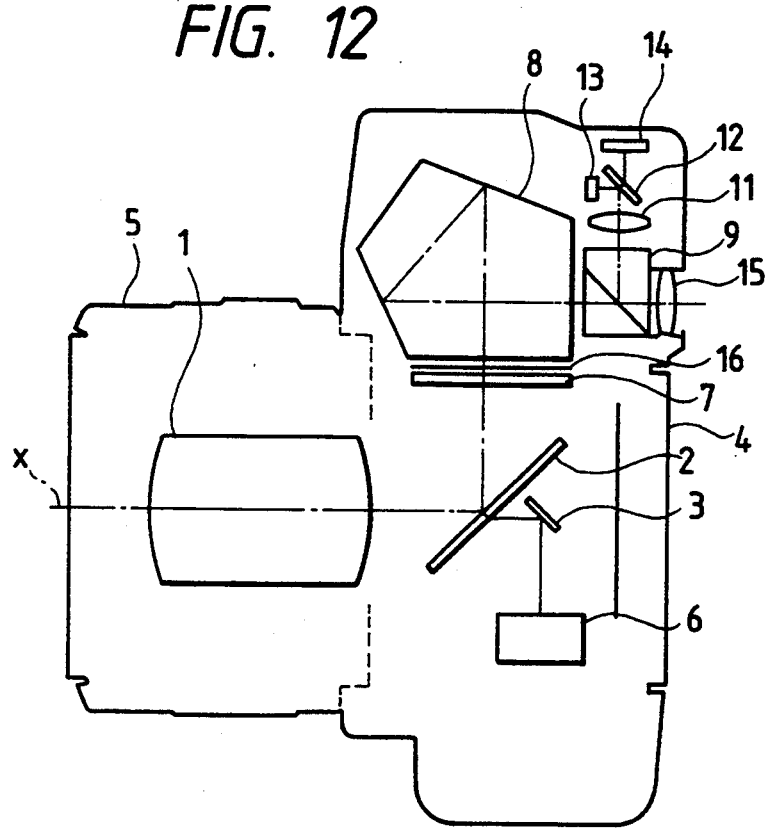

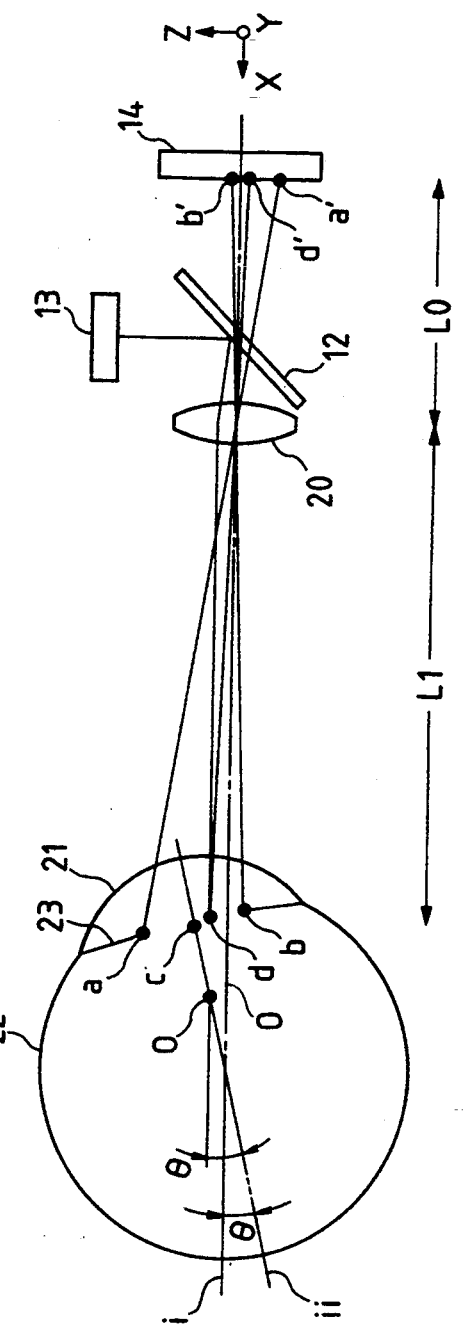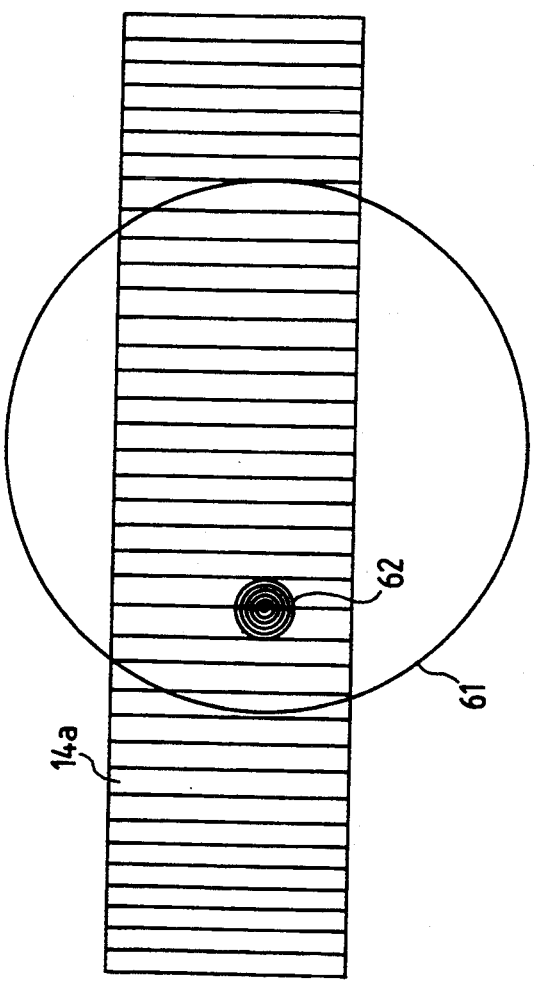
FIG. 13
FIG. 14

CAMERA IN WHICH FOCUS IS DETECTED TO A PLURALITY OF VIEWFIELDS WITHIN A OBSERVATION BLOCK WHICH IS SELECTED BY VISUAL AXIS DETECTING MEANS

This application is a continuation of application Ser. No. 08/200,561, filed Feb. 22, 1994, which is a continuation of Ser. No. 07/865,042, filed Apr. 3, 1992, both now abandoned.

BACKGROUND OF THE INVENTION

1. Field of the Invention

This invention related to apparatus which detects the operator's visual axis and controls an optical apparatus on the basis of the detected information.

Also, this invention relates to a silver salt or video camera, and particularly ensures that the focus of the camera will be adjusted to an object the operator is gazing at.

2. Related Background Art

Auto focus single-lens reflex cameras recently available in the market include ones having a plurality of distance measuring view fields (detection view fields). The advent of cameras of such type, as compared with conventional cameras which effect distance measurement only in the center of the image field, has made it unnecessary to perform the operation of so-called AF lock which is the re-framing after focusing to an object. Accordingly, the snapshooting capability is improved and particularly, the degree of freedom of framing to a moving object is considerably increased. This is also the advantage that even photographers who are not accustomed to cameras have become able to take photographs without being nervous about focusing. Attempts are being made to further increase the number of distance measuring view fields to improve the simplicity of photographing.

Now, when a number of distance measuring view fields are provided, to make the most advantage thereof, always an optimal distance measuring view field must be selected and focus adjustment must be made on the basis of this information. For this purpose, the technique of detecting the photographer's visual axis position and focusing the camera on the object in that portion is disclosed in Japanese Laid-Open Patent Application Nos. 1-241511 and 2-32312.

However, there is a problem which cannot be solved by a construction in which the focus follows the visual axis position. That is, the movement of the visual axis is very great in order to view an entire object, and the visual axis position detected at a certain moment, if it is at least a point on the object, is not always a point on the object that is best suited for focusing. In that sense, even if a position suited for focusing is set on the basis of the result of the detection at a certain moment, it does not always coincide with the photographer's intention, and it is desired to set conditions with even the physiological behavior of perception taken into account.

SUMMARY OF THE INVENTION

It is a first object of the present invention to make the operation of an optical apparatus more approximate to the operator's intention when the optical apparatus is to be controlled by the output of an apparatus for detecting the visual axis (or the visual point on the image field).

It is a second object of the present invention to make the operation of the optical apparatus approximate to an image or a photographing condition intended by the operator.

It is a third object of the present invention to specify, in a camera provided with visual axis detecting means and means for detecting the degree of focusing of an objective lens or the object distance, a plurality of detection view fields near the position of the visual axis detected by the visual axis detecting means, and to the focus adjustment information of the objective lens on the basis of the focus detection information regarding these detection view fields.

Further objects of the present invention will become apparent from the following detailed description of an embodiment of the invention.

BRIEF DESCRIPTION OF THE DRAWINGS

FIG. 11 is a flow chart for illustrating the subroutine of setting the distance measuring view field range.

FIG. 12 is a cross-sectional view of a single-lens reflex camera according to an embodiment of the present invention.

FIG. 13 illustrates a method of detecting the visual axis.

FIG. 14 shows the optical relation between the reflected image of the front eye part and the picture element row of a photoelectric conversion element.

DETAILED DESCRIPTION OF THE PREFERRED EMBODIMENTS

Figure 24:
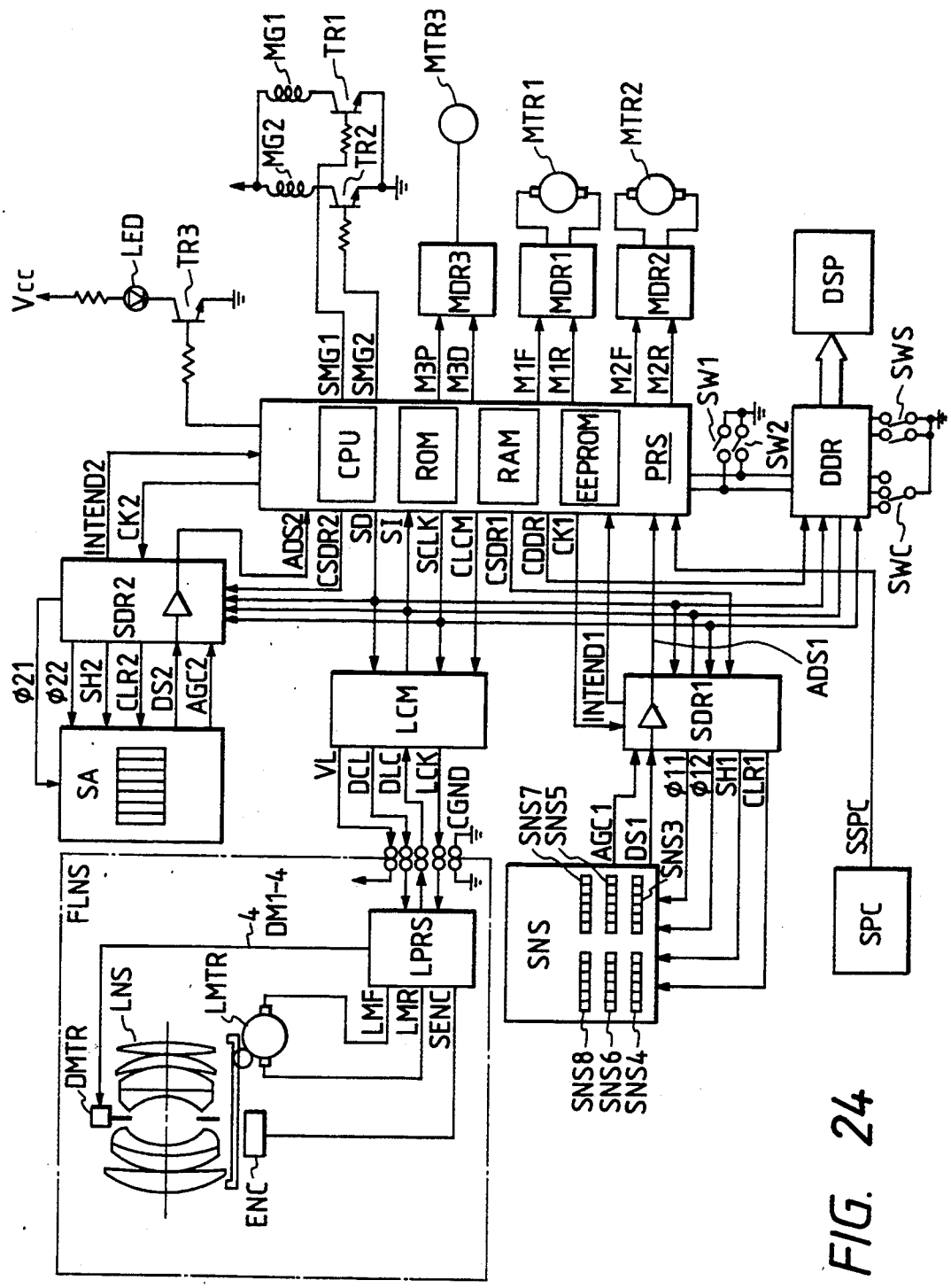
FIG. 24 is a block diagram of the electric system of the camera.

An embodiment of the present invention will hereinafter be described with reference to the drawings. FIGS. 1 to 11 are flow charts for illustrating the operations of the apparatus, FIG. 12 shows the optical arrangement of a camera provided with an apparatus for detecting the direction of the visual axis, and FIGS. 13 to 16 illustrate a method of detecting the direction of the visual axis. FIGS. 17 to 20 illustrate the construction of a focus detecting apparatus, and FIG. 24 diagrammatically shows chiefly the electric system of the camera.

Referring first to FIG. 12, the reference numeral 4 designates the camera body of a single-lens reflex camera, and the reference numeral 5 denotes a lens barrel removably mounted on or secured to the camera body 4. The reference numeral 1 schematically designates a photographing lens which is contained in the lens barrel 5 and is moved in the direction of the optical axis X by the drive force of a drive motor, not shown, whereby focusing is executed.

The reference numeral 2 denotes a quick return mirror (a main mirror), and the reference numeral 3 designates a sub-mirror supported by the main mirror 2. The reference numeral 6 denotes a focus detecting apparatus which, as will be described later in detail, receives light refractively passed through the photographing lens 1, transmitted through the main mirror 2 and reflected by the sub-mirror 3.

On the other hand, the reference numeral 7 disposed on the reflection optical path of the main mirror 2 designates a focusing screen, the reference numeral 8 denotes a pentagonal prism, the reference numeral 15 designates an eyepiece, and these together constitute a finder system. The reference numeral 9 denotes a light divider having obliquely disposed therein a dichroic mirror reflecting infrared light and transmitting visible light therethrough. The light divider 9 is provided in the optical path of the finder system. The reference numeral 11 designates a light projecting and receiving lens, the reference numeral 12 denotes a half mirror, and the reference numeral 13 designates an illuminating point light source such as an LED emitting infrared light. It is to be understood that the light source 13 is at one focus position of a system comprising the light projecting and receiving lens 11 and the eyepiece 15 combined together, and a light beam emitted from the light source 13 emerges as a parallel light beam from the eyepiece 15 via the half mirror 12, the light projecting and receiving lens 11 and the light divider 9. The reference numeral 14 denotes a photoelectric converter provided with an element array. The photoelectric converter 14 is disposed at a position whereat the front eye part is imaged by the eyepiece 15 and the light projecting and receiving lens 11, and receives the image of an eyeball and the corneal reflected image of the light source. The members 9, 11, 12, 13, 14 and the eyepiece 15 together constitute the optical system of a visual axis detecting apparatus.

A method of detecting the direction of the visual axis will now be described with reference to FIG. 13. In FIG. 13, the reference numeral 20 designates a lens comprising the light projecting and receiving lens 11 and the eyepiece 15 combined together, the reference numeral 22 denotes the observer's eyeball in the fashion of a model eye, the reference numeral 21 designates a cornea, and the reference numeral 23 denotes an iris.

The infrared light emitted from the LED 13 is made into a parallel light beam by the lens 20 and illuminates the cornea 21 of the eyeball. At this time, the corneal reflected image d formed by a part of the infrared light reflected by the surface of the cornea 21 is created near the iris 23, is condensed by the lens 20, is transmitted through the half mirror 12 and is re-imaged at a position d' on the photoelectric converter 14.

Also, light beam from the end portions a and b of the iris 23 form the images of these end portions a and b at positions a' and b' on the photoelectric converter 14 through the half mirror 12. Where the rotation angle $\theta$ of the optical axis B of the eyeball with respect to the optical axis A of the lens 20 is small, when the Z coordinates of the end portions a and b of the iris 23 are Za and Zb, respectively, the coordinates Zc of the central position c of the iris 23 are expressed as $$Zc \simeq (Za + Zb)/2.$$

Also, when the Z coordinates of the position d at which the corneal reflected image is created are Zd and the distance from the center of curvature 0 of the cornea 21 to the center C of the iris 23 is OC, the rotation angle $\theta$ of the optical axis B of the eyeball substantially satisfies the following relational expression:

$$OC * \sin \theta \simeq Zc - Zd \cdots \quad (1)$$

Here, the Z coordinates Zd of the position d of the corneal reflected image and the Z coordinates Zo of the center of curvature 0 of the cornea 21 are coincident with each other. Therefore, by detecting the positions of respective particular points (the corneal reflected imaged and the end portions a and b of the iris) projected onto the photoelectric converter 14, the rotation angle $\theta$ of the optical axis B of the eyeball can be found. At this time, expression (1) is rewritten as follows:

$$\beta * OC * \sin \theta \simeq (Za' + Zb')/2 - Zd' \quad (2)$$

where $\beta$ is the magnification determined by the distance L1 between the position d of the cornear reflected image and the lens 20 and the distance L0 between the lens 20 and the photoelectric converter 14.

While there has been shown a visual axis detecting method using the reflected image on the cornea, i.e., the so-called Purkinje first image, the formation of other Purkinje images such as the reflected images of the crystalline lens is known from the structure of the human eye, and these images are also formed on the photoelectric converter 14, but the images other than the Purkinje first image are relatively low in intensity of light and therefore, they are not any hindrance to the detection by being subjected to suitable electrical treatment. Also, when a person actually sees an object, a yellow spot becomes the center of the view field and therefore, some deviation exists between the geometrical optical axis of the eyeball and the visual axis, but this poses practically no problem by applying a predetermined amount of modification thereof during calculation, and where precise modification is required, the method described in Japanese Laid-Open Patent Application No. 241511/1989 can be adopted.

It is to be understood that in the arrangement of FIG. 13, the photoelectric converter 14 comprises elements one-dimensionally arranged in a vertical direction as viewed in the figure, and for the simplification of the detecting apparatus, as depicted in FIG. 14, each element 14a is of a stripe-like shape having a length several times as great as the width. Thus, detection in the lengthwise direction becomes difficult, but the apparatus can be made almost insensitive to the parallel movement of the eyeball in the vertical direction or the rotation of the eyeball and signal processing becomes simple. In order to obtain a similar effect, a cylindrical lens having refractive power in a direction perpendicular to the direction of arrangement of the elements may be adhesively secured to the front face of the photoelectric converter.

Figure 15:
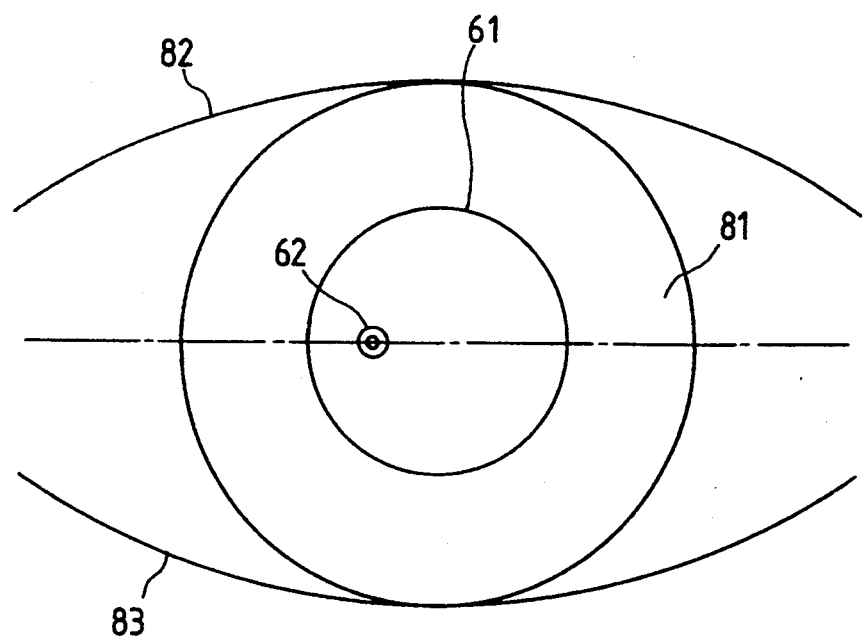
FIG. 15 shows the optical relation between the front eye part and the Purkinje reflected image.

FIG. 14 depicts the manner in which a pupil image 61 and a Purkinje first image 62 are formed on the photoelectric converter, and FIG. 15 shows the image of the observing eye as viewed from the front.

Figure 16:
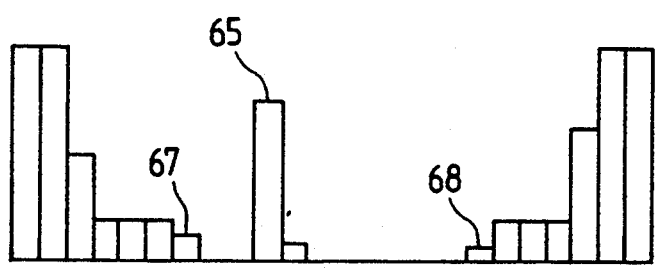
FIG. 16 shows the output of the photoelectric conversion element.

When the image of the observing eye is received by the photoelectric converter, there is obtained an output as shown in FIG. 16, wherein 65 designates an output corresponding to the Purkinje first image 62, 67 and 68 correspond to the edge portions of the iris, and the light output values on both sides correspond to the sclera (the white of the eye).

The center of the pupil is obtained from the positional information of the edge portions 67 and 68. Most simply, in the edge portions, the positional coordinates of the center of the pupil in which picture element numbers creating an output approximate to half the average value of the iris portion 81 are $i_1$ and $i_2$ are given by
$$i_0 = (i_1 + i_2)/2.$$

The position of the Purkinje first image is found from the greatest peak which locally appears in the dark portion of the pupil and therefore, the rotational situation of the eyeball and accordingly, the direction of the visual axis can be known from the relative positional relation between this position and the aforementioned center of the pupil. The reference numerals 82 and 83 designate the upper and lower eyelids.

Figure 18:
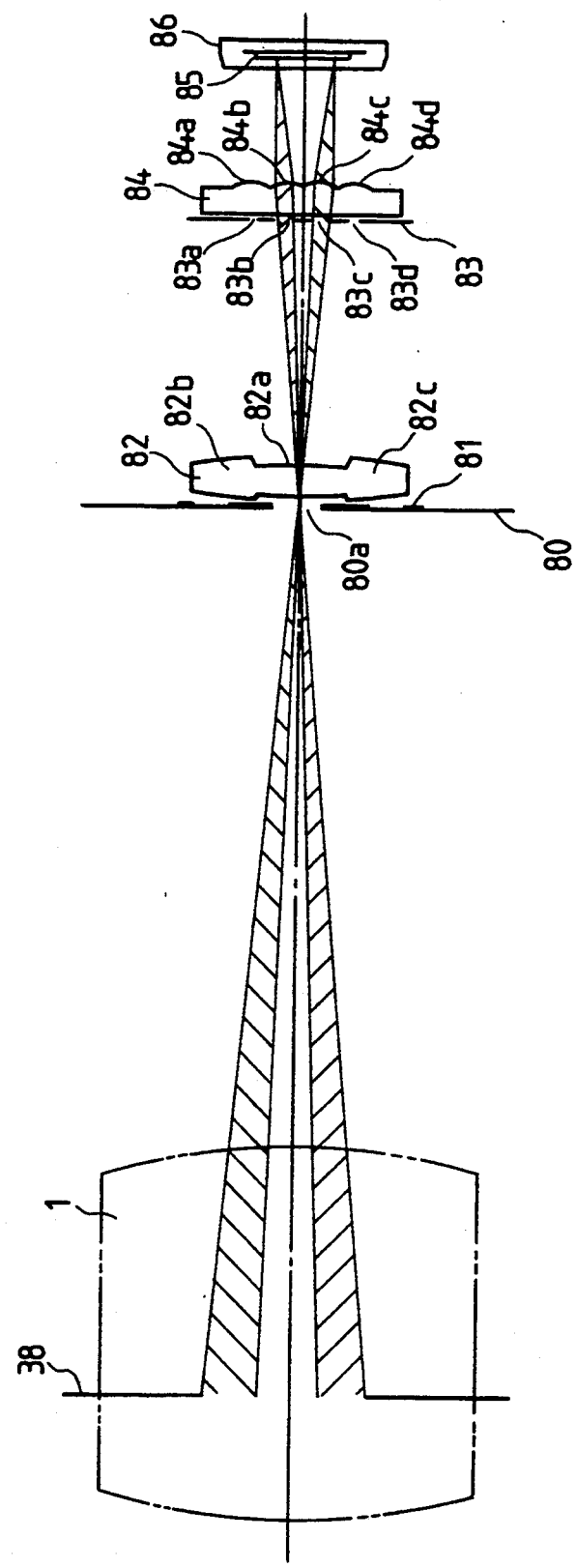
FIG. 18 shows the optical behavior during the detection of the on-axis detection view field.
Figure 19:
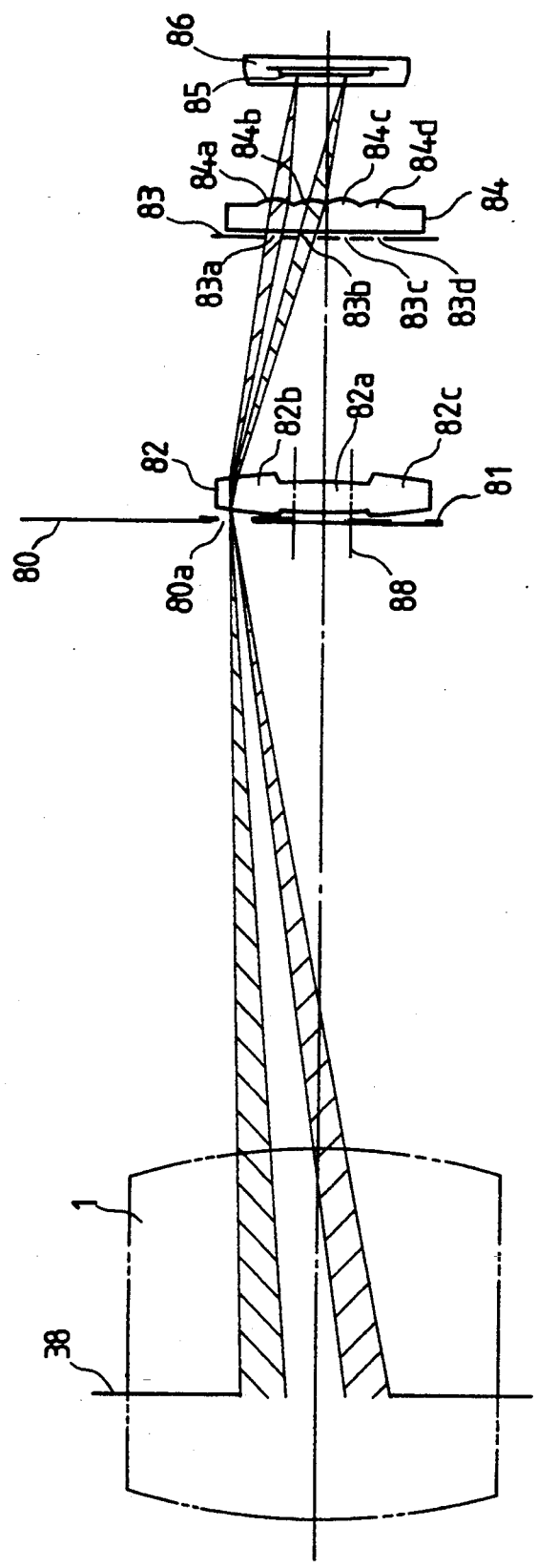
FIG. 19 shows the optical behavior during the detection of the off-axis detection view field.

The construction of a focus detecting apparatus will now be described with reference to FIG. 17, and the present focus detecting apparatus is designed so as to be capable of selecting one of a plurality of observation blocks each having a plurality of detection view fields. FIG. 18 shows the optical action when the on-axis block is selected, and FIG. 19 shows the optical action when the off-axis block is selected.

Figure 17:
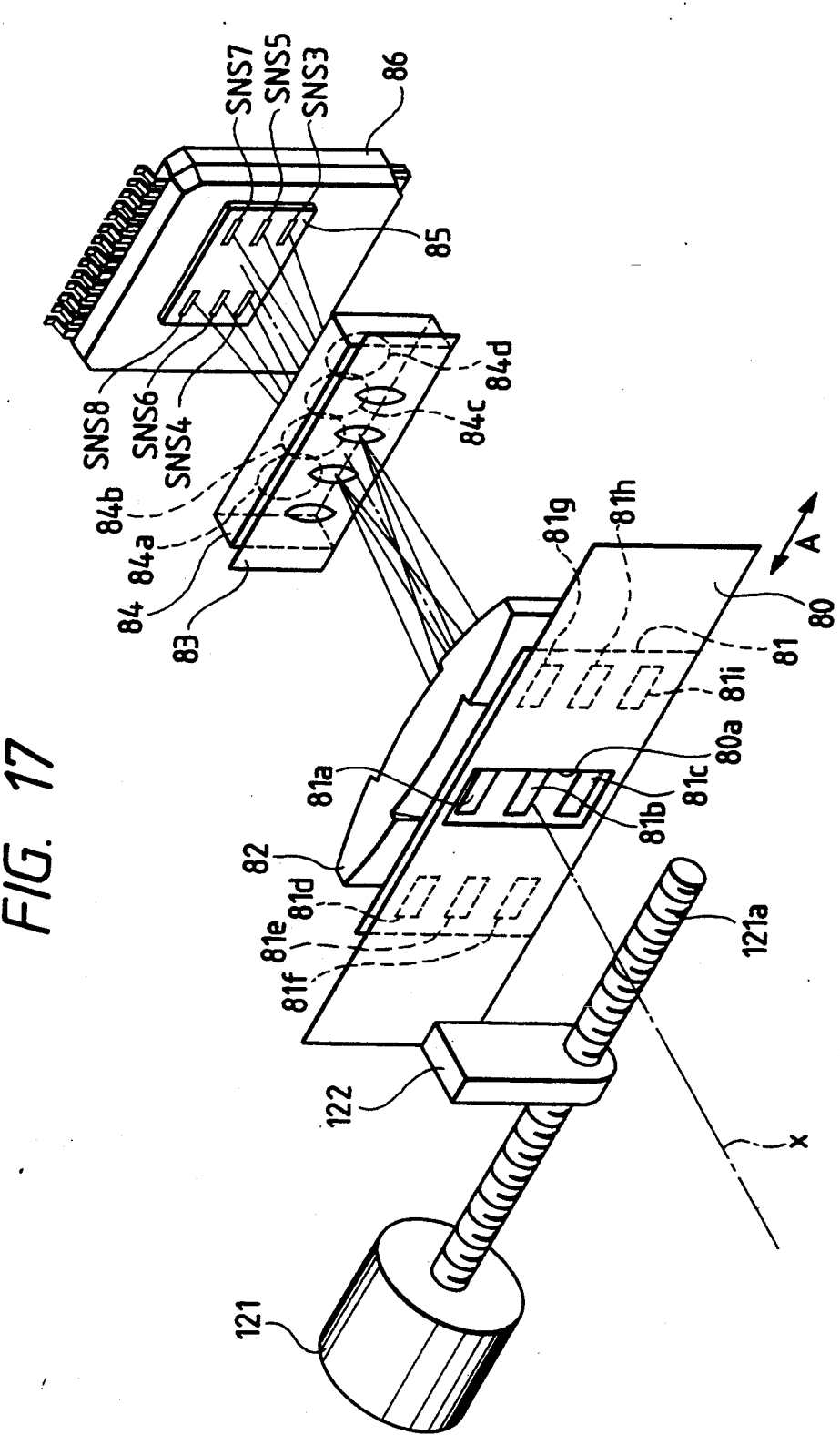
FIG. 17 is a perspective view of a focus detecting apparatus.

In FIG. 17, the letter X designates the optical axis which corresponds to the region after the light is reflected by the sub-mirror 3 of FIG. 12. A member 81 depicted by broken lines and solid lines is a field mask which is provided with a rectangular openings 81a, 81b, 81c, left off-axis blocks 81d, 81e, 81f and right off-axis blocks 81g, 81h, 81i for determining the detection view field of the on-axis block and is disposed on or near the predetermined imaging plane of the photographing lens. The reference numeral 80 denotes a movable mask provided with a rectangular opening 80a for selecting the on-axis block or one of the two off-axis blocks. It is to be understood that the movable mask 80 is slidably supported on a holding member, not shown, in proximity to the field mask 81. A driving piece 122 is secured to one end portion of the movable mask 80, ad the driving piece is formed with an internal thread. The reference numeral 121 designates a stepping motor, and a lead screw 121a is connected to the rotary shaft of the motor. The lead screw 121a is threadably engaged with the internal thread of the aforementioned driving piece and therefore, when electric power is supplied to the stepping motor, the lead screw 121a is rotated to thereby move the driving piece 122 and the movable mask 80 in the direction of arrow A.

Accordingly, by the stepping motor 121 being rotated in forward and reverse directions, the opening in the movable mask can select three positions corresponding to the three blocks of the field mask 81.

The reference numeral 82 denotes a dividing field lens which imparts different refractive powers to a light beam passed through the on-axis block and a light beam passed through the off-axis blocks, and adjusts the light beams so that a photoelectric conversion element 85 which will be described later may receive the light beams in a good condition.

The reference numeral 84 designates a secondary imaging lens unit comprising positive lenses 84a–84d made integrally with one another. The positive lenses 84a to 84d form three pairs, i.e., 84a and 84d, 84b and 84c, and 84c and 84d.

The reference numeral 83 denotes a multi-aperture mask provided with elliptical openings corresponding to the respective positive lenses to regulate the light beam passed through the positive lenses 84a–84d. The reference numeral 85 designates a photoelectric conversion element having sets of picture element arrays SNS3 and SNS4, SNS5 and SNS6, SNS7 and SNS8, and enveloped in a package 86 made of transparent resin. Light beams passed through the upper, middle and lower detection view fields of each block of the field mask 81 enter the lower, middle and upper sets of arrays, respectively, of the photoelectric conversion element 85.

Figure 20:
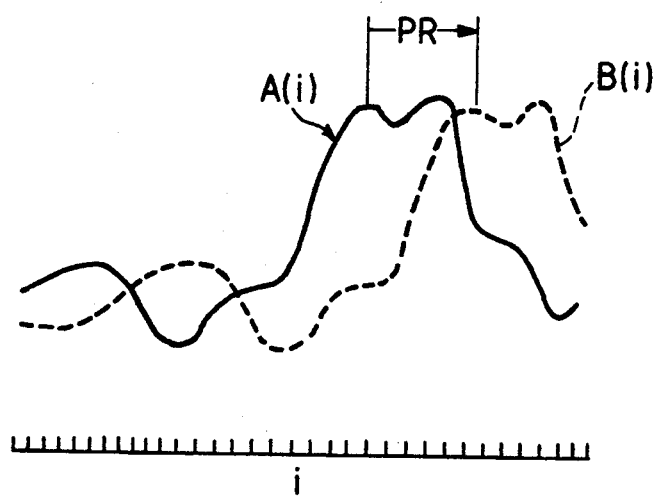
FIG. 20 shows an example of the output signal regarding any one view field of the focus detecting apparatus.

FIG. 18 shows an example of the case where the opening 80a in the movable mask 80 is on the optical axis of the objective lens 1. The light beam for focus detection passes through the opening 80a in the movable mask and an opening 81b in a fixed mask, and thereafter enters the central portion 82a of the dividing field lens. This dividing field lens 82 in its central portion places the multi-aperture mask 83 and the exit pupil plane 38 of the objective lens into a conjugate relation, and particularly projects the centers of the two openings 83b and 83c in the multi-aperture mask onto the center of the exit pupil. Also, light beams passed through the openings 83b and 83c in the multi-aperture mask enter the lens portions 84b and 84c, respectively, of the re-imaging lens 84 disposed behind it. The lenses 84b and 84c of the secondary imaging lens unit place the predetermined imaging plane of the objective lens 1 and the light receiving surface of the photoelectric conversion element 85 into a conjugate relation, and form a pair of secondary images of an object on the light receiving surface of the photoelectric conversion element. The inverted projected images of a pair of picture element arrays SNS5 and SNS6 comprising a number of picture elements disposed on the photoelectric conversion element on which the image of the opening 81b in the fixed mask is formed by the secondary imaging lens provide a distance measuring view field. The above-mentioned secondary images have their relative spacing varied in conformity with the imaged state on the predetermined imaging plane of the photographing lens and therefore, by applying predetermined calculation after the secondary images are photoelectrically converted, the imaging state of the photographing lens can be known. A(i) and B(i) in FIG. 20 are examples of the photoelectrically converted signal.

Also, light beams which have entered the focus detecting system from the upper and lower openings in the field mask 81 are imaged on the picture element arrays SNS3, SNS4, SNS7 and SNS8 of the photoelectric conversion element by the action of the secondary imaging lenses 84b and 84c and form the secondary images of the object. These images can likewise be placed on the fixed mask portions 81a and 81c by the utilization of the fact that the relative spacing thereof is varied in conformity with the imaging state of the objective lens.

FIG. 19 shows an example of the case where the opening 80a in the movable mask 80 is at a position off the optical axis of the objective lens 1. The light beam for focus detection passes through the opening 80a in the movable mask and the opening 81e in the fixed mask, and thereafter enters the marginal portion 82b of the dividing field lens 82. The optical axis 88 of the marginal portion 82b of the dividing field lens, unlike the optical axis of the objective lens, places the multi-aperture mask 83 and the exit pupil plane 38 of the objective lens 1 into a conjugate relation and also projects the centers of the openings 83a and 83b in the multi-aperture mask onto the center of the exit pupil. The light beams passed through the openings 83a and 83b in the multi-aperture mask enter the lens portions 84a and 84b, respectively, of the secondary imaging lens 84, and form the secondary images of the object on a pair of picture element arrays SNS5 and SNS6 of the photoelectric conversion element. Accordingly, as in the case of the on-axis detection view field described with reference to FIG. 18, the imaging state of the objective lens can be known by applying predetermined calculation to signals obtained by photoelectrically converting the pair of secondary image by the picture element arrays SNS5 and SNS6. The upper and lower openings in the field mask 81e can be detected by photoelectrically converting the images on the picture element arrays SNS3, SNS4, SNS7 and SNS8.

The detection system on the side of field masks 81g, 81h and 81i is axisymmetric and therefore need not be described.

Figure 21:
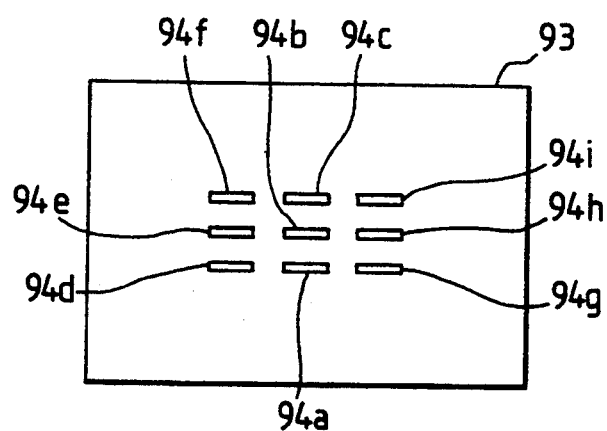
FIG. 21 shows the manner in which detection view fields are indicated in the finder view field of a single-lens reflex camera.

As described above, the picture element arrays SNS3 and SNS4 are used for the focus detection at the positions of the openings 81d, 81a and 81g in the field mask, the picture element arrays SNS5 and SNS6 are used for the focus detection at the positions of the openings 81e, 81b and 81h, and the picture element arrays SNS7 and SNS8 are used for the focus detection at the positions of the openings 81f, 81c and 81i. The focus detection at a total of nine positions is possible by three pairs of picture element arrays. In any case, the inverted images of the picture element arrays projected by the secondary imaging lens are actual detection view fields, and if these are indicated in the finder view field as shown in FIG. 21, it will be convenient to the photographing operation. However, detection frames 94a to 94i may be written on one surface of the focusing screen of FIG. 4, or for example, a liquid crystal display plate 16 may be discretely provided above and adjacent to the focusing screen and the detection view field of a selected block may be displayed thereon.

Figure 22:
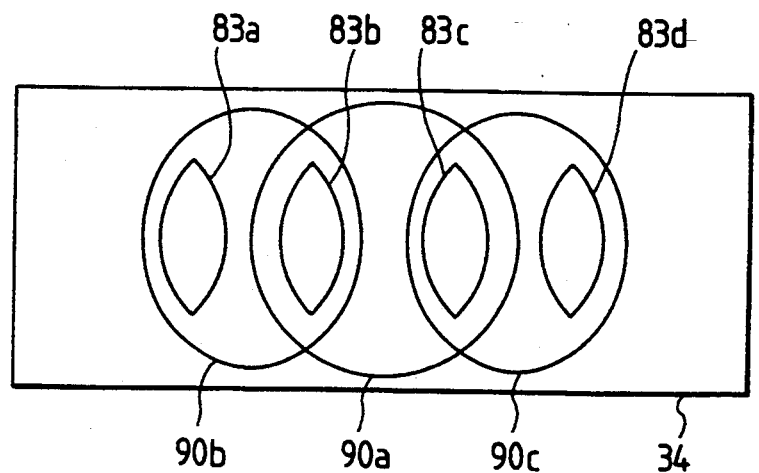
FIG. 22 is a front view of the multi-aperture mask of the focus detecting apparatus.

FIG. 22 is a detailed view of the multi-aperture mask 83 and particularly shows the positional relation thereof with the image of the exit pupil. In FIG. 22, the reference characters 90a, 90b and 90c designate the images of the exit pupil of the objective lens 1 formed by the central portion 82a and marginal portions 82b and 82c, respectively, of the dividing field lens, and these images are ones obtained through the nine openings in the field mask 81. The openings 83b and 83c in the multi-aperture mask are placed in the interior of the exit pupil image 90a, the openings 83a and 83b in the multi-aperture mask are placed in the interior of the exit pupil image 90b, and the openings 83c and 83d in the multi-aperture mask are placed in the interior of the exit pupil image 90c. The openings 83b and 83c in the multi-aperture mask are in the common area of two exit pupil images, and the light beams from two detection view fields selectively enter these openings depending on the position of the movable mask 80. By such a construction that an opening in the mask receives the light beams from two detection view fields, it has become possible to make the sensor area small, and yet direct the light beams from the openings 81a to 81i in the field mask onto the photoelectric conversion element with the projected images of the predetermined imaging plane of the photographing lens and the photoelectric conversion element being imaged on a reduced scale.

Figure 23:
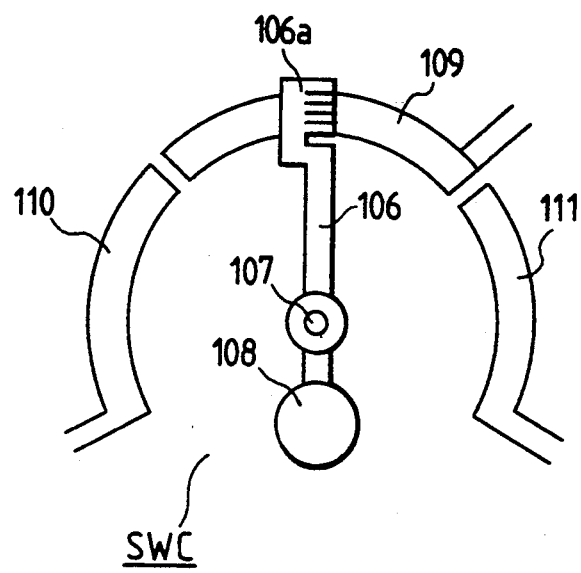
FIG. 23 is a front view of a switch for detecting the posture of the camera.

FIG. 23 shows a switch for detecting whether the camera is horizontally or vertically held at the ready. If a two-dimensional area sensor is adopted as the photoelectric converter 14 in the visual axis detecting apparatus shown in FIG. 12, it will be possible to detect the horizontal direction of the visual axis if the output of the vertical side of the area sensor and the output of the horizontal side of the area sensor are changed over in conformity with the posture of the camera. However, the present embodiment adopts a one-dimensional sensor as the photoelectric converter 14 and therefore, when the camera is vertically held at the ready, erroneous detection will take place and thus, the present embodiment assumes a construction for discontinuing detection in such a case.

FIG. 23 shows an example of a detection switch utilizing gravity, and the reference numeral 107 denotes a rotary shaft. A weight 108 is provided on one end of a journalled lever, and a microbrush 106a constructed so as to reduce friction is provided on the other end of the lever.

The reference numerals 109, 110 and 111 designate curved electrodes disposed on a common circle. A horizontal position signal is produced when the microbrush 106a and the electrode 109 are in contact with each other, and a vertical position signal is produced when the microbrush 106a and the electrode 110 or 111 are in contact with each other.

FIG. 24 shows chiefly an electric system. In FIG. 24, FLNS corresponds to the lens barrel 5 of FIG. 12, and 1 corresponds to LNS. LED corresponds to the illuminating light source 13 of FIG. 12, and SA corresponds to the photoelectric converter 14. Also, SNS corresponds to the member 6 of FIG. 12, and more specifically to the power source converting element 85 of the focus detecting apparatus of FIG. 17, and MTR3 corresponds to the stepping motor 121 of FIG. 17. Incidentally, MTR1 designates a film feeding motor, and MTR2 denotes a shutter spring winding motor. SW1 and SW2 denote switches adapted to be successively closed by the depression of a release button, not shown, and SPC designates a photometry sensor for exposure control. DSP denotes a display for displaying the various kinds of information of the camera.

On the other hand, PRS designates the controller of the camera which is, for example, a one-chip microcomputer having therein a CPU (central processing unit), a ROM, a RAM, a EEPROM (electrically erasable programmable ROM) and an A/D converting function, and which executes the operations of the camera such as the automatic exposure controlling function, the automatic focus detecting function, film winding and rewinding in accordance with the sequence program of the camera stored in the ROM. EEPROM is a kind of non-volatile memory in which various adjustment data are written in the process. The controller PRS of the camera communicates with the surrounding circuits and the lens by the use of communication signals SO, SI and SCLK, and controls the operations of each circuit and the lens.

SO is a data signal output from PRS, SI is a data signal input to PRS, and SCLK is a synchronizing signal for the signals SO and SI.

LCM designates a lens communication buffer circuit which gives a voltage source VL for the lens to the lens during the operation of the camera, and provides a buffer for the communication between the camera and the lens when a signal CLCM from PRS is at a high potential level.

When PRS renders CLCM into "H" and delivers predetermined data from SO in synchronism with SCLK, LCM outputs buffer signals LCK and DCL for SCLK and SO, respectively, to the lens through the contact between the camera and the lens. At the same time, LCM outputs a buffer signal for a signal DLC from the lens to SI, and PRS receives as an input the data of the lens from SI synchronism with SCLK.

SDR1 denotes a driving circuit for a line sensor device SNS for focus detection. SDR1 is selected when a signal CSDR1 is "H", and is controlled from PRS by the use of SO, SI and SCLK.

A signal CK1 is a clock for producing CCD driving clocks $\phi 11$ and $\phi 12$, and a signal INTEND1 is a signal for informing PRS that the accumulating operation has been terminated.

The output signal OS1 of SNS is a time-serial image signal synchronized with the clocks $\phi 11$ and $\phi 12$, and is amplified by an amplifying circuit in SDR1, and thereafter is output as AOS1 to PRS. PRS receives AOS1 as an input from its analog input terminal, and A/D-converts it by the A/D converting function therein, in synchronism with CK1, and thereafter stores in into a predetermined address of the RAM.

AGC1 which also is the output signal of SNS is the output of an AGC controlling sensor in SNS, and is input to SDR1 for use for the accumulation control of SNS.

One of the photoelectric conversion outputs of two images formed on a pair of sensor arrays is shown as A(i) and the other is shown as B(i), in FIG. 20. In this example, the number of the picture elements of the sensor is 40 (i=0, ..., 39).

A signal processing method for detecting the amount of image deviation PR from the image signals A(i) and B(i) is disclosed in Japanese Laid-Open Patent Application No. 58-142306, Japanese Laid-Open Patent Application No. 59-107313, Japanese Laid-Open Patent Application No. 60-101513 or Japanese Laid-Open Patent Application No. 63-18314.

SDR2 designates a driving circuit for a line sensor device SA for visual axis detection. SDR2 is selected when a signal CSDR2 is "H", and is controlled from $PR_S$ by the use of SO, SI and SCLK.

A signal CK2 is a clock for producing CCD driving clocks $\phi 21$ and $\phi 22$, and a signal INTEND2 is a signal for informing PRS that the accumulating operation has been terminated.

The output signal OS2 of SA is a time-serial image signal synchronized with the clocks $\phi 21$ and $\phi 22$, and is amplified by an amplifying circuit in SDR2, and thereafter is output as AOS2 to PRS. PRS receives AOS2 as in input from its analog input terminal, and A/D-converts it by the A/D converting function therein in synchronism with CK2, and thereafter stores it into a predetermined address of the RAM.

AGC2 which also is the output signal of SNS2 is the output of an AGC controlling sensor in SA, and is input to SDR2 for use for the accumulation control of SNS.

LED (13 in FIG. 12) is an LED for illuminating the human eye, and is electrically energized by a transistor TR3 simultaneously with the accumulation in a photoelectric element SA (14 in FIG. 12) and is used for the detection of the visual axis.

SPC designates a photometry sensor for exposure control which receives the light passed through the photographing lens, and the output SSPC thereof is input to the analog input terminal of PRS and is A/D-converted, whereafter it is used for automatic exposure control (AE).

DDR denotes a switch sensing and display circuit. DDR is selected when a signal CDDR is "H", and is controlled from PRS by the use of SO, SI and SCLK. That is, DDR changes over the display on the display member DSP of the camera on the basis of data sent thereto from PRS, and communicates the ON and OFF states of various operating members such as a release button, not shown (operatively associated with switches SW1 and SW2) and a mode setting button and the state of the gravity detecting switch SWC shown in FIG. 23 to PRS.

MDR1 and MDR2 designates driving circuits for the film feeding motor MTR1 and the shutter spring winding motor MTR2, respectively. MDR1 and MDR2 execute the forward and reverse rotations of these motors by signals M1F, M1R, M2F and M2R.

MDR3 denotes a driving circuit for the movable mask 80 of the focus detecting apparatus and a stepping motor MTR3 for movement (121 in FIG. 17). MDR3 receives the number of driving steps by a signal M3P and the instructions regarding the direction of driving by a signal M3D, distributes a pulse to each phase of the stepping motor, and effects current amplification for energization.

MG1 and MG2 designate magnets for starting the movement of the forward and rearward shutter curtains, respectively. These magnets are electrically energized by signals SMG1, SMG2 and amplifying transistors TR1, TR2, and shutter control is effected by PRS.

SW1 and SW2 denote switches operatively associated with the release button 87. The switch SW1 is closed by the first-stage depression of the release button 87, and subsequently the switch SW2 is closed by the second-stage depression of the release button 87. The controller PRS effects photometry, visual axis detection and automatic focus adjustment upon closing of SW1, and effects exposure control and subsequent film winding with the closing of SW2 as a trigger.

The switch SW2 is connected to the "interrupt input terminal" of the controller PRS which is a microcomputer, and interruption is executed by the closing of SW2 even when the program activated by the closing of SW1 is being executed, whereby control can be immediately shifted to a predetermined interruption program.

The switch sensing and displaying circuit DDR, the motor driving circuits MDR1, MDR2 and shutter control have nothing direct to do with the present invention and therefore need not be described in detail.

A signal DCL input to a control circuit LPRS in the lens in synchronism with LCK is command data from the camera to the lens FLNS, and the operation of the lens to the command is predetermined.

LPRS analyzes the command in accordance with a predetermined procedure, and performs the focus adjusting and aperture controlling operations and the outputting of various parameters of the lens (such as fully open F number, focal length and the coefficient of defocus amount vs. amount of axial movement) from an output DLC.

In the embodiment, there is shown an example of a generally axially moved single lens, and when a command for focus adjustment is sent from the camera, the focus adjusting motor LMTR is driven by signals LMF and LMR in accordance with the amount and direction of driving sent at the same time to thereby move the optical system in the direction of the optical axis and effect focus adjustment. The amount of movement of the optical system is monitored by the pulse signal SENC of an encoder circuit ENC and is counted by a counter in LPRS, and at a point of time whereat predetermined movement has been completed, the signals LMF and LMR are rendered into "L" to thereby brake the motor LMTR.

When a command for aperture control is sent from the camera, a stepping motor DMTR conventional as a motor for aperture driving is driven in accordance with the number of aperture steps sent at the same time. The stepping motor is capable of open control and therefore does not require an encoder for monitoring the operation thereof.

The operation of the camera will now be described with reference to FIGS. 1 to 11.

Figure 1:
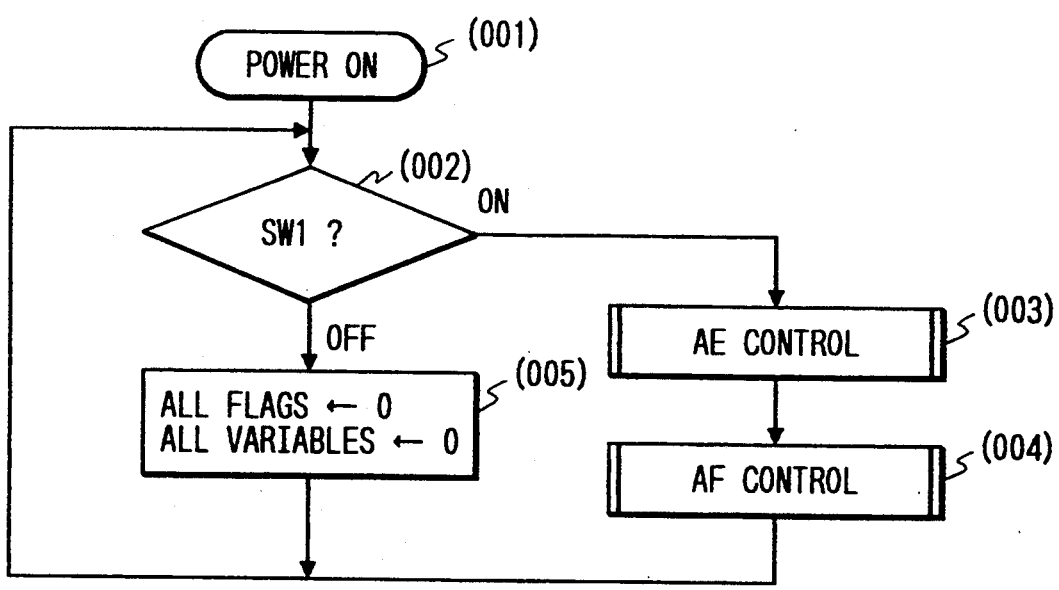
FIG. 1 is a flow chart schematically showing the operation of an entire camera.

FIG. 1 is a flow chart showing the general flow of the program stored in PRS. When the execution of the program is started by the above-described operation, at a step (002), the detection of the state of the switch SW1 adapted to be closed by the first stroke of the release button is done and when the switch SW1 is OFF, at a step (005), a "driving stop command" is sent to the lens, whereby the instructions for the stoppage of driving are given. At the step (005), a flag for control set in the RAM in PRS is cleared. The steps (002) and (005) are repetitively executed until the switch SW1 is closed or the power source switch is opened and accordingly, even during lens driving, when the switch SW1 is closed, the lens stops being driven. By the switch SW1 being closed, a shift is made to a step (003). The step (003) means the "AE control" subroutine. In this "AE control" subroutine, a series of camera operation controls such as the photometry calculation process, exposure control, shutter charge and film winding after exposure are effected. The "AE control" subroutine has nothing direct to do with the present invention and therefore need not be described in detail, but the epitome of the function of this subroutine is as follows.

When the switch SW1 is ON, this "AE control" subroutine is executed, and each time it is executed, photometry and exposure control calculation and display are effected. When the switch SW2 is closed by the second stroke of the release button, not shown, the release operation is started by the interrupt processing function of the microcomputer PRS, and the control of the aperture or the shutter time is effected on the basis of the exposure amount found by the above-mentioned exposure control calculation, and after the termination of exposure, the shutter charge and the film feeding operation are performed, whereby photographing for one frame of film is completed.

The camera of the embodiment of the present invention has two modes, "one shot" and "servo", as the AF mode, and is designed to be automatically changed over in conformity with an object. When the AF mode is "one shot", once the camera is focused, the lens driving operation is not performed again until the switch SW1 is opened, and release cannot be effected until the camera is focused.

In the case of the "servo" mode, lens driving following the movement of the object is continuedly effected until after the camera is focused, and release is permitted at a point of time whereat the lens driving by moving object foreseeing control (which will be described later) has been terminated.

As previously described, the release operation is performed by the closing of the switch SW2, but even when the switch SW2 remains closed after photographing by one frame of film is completed, a return is made with the "AE control" being regarded as having once been terminated. Describing the operation when the switch SW2 remains closed, in the case of the "one shot" mode, release cannot be done until the camera is focused, and release becomes possible only when the camera is focused, and then photographing by one frame is effected, whereafter the mode is the "one shot" mode and therefore, focus adjustment is not effected and photographing by the next frame is effected with the lens remaining at the same lens position, and photographing is continuously executed as long as the switch SW2 is closed.

In the case of the servo mode, "release operation", "AF control", "release operation" and "AF control" are alternately repeated as long as the switch SW2 is closed.

Now, as described above, when the "AE control" subroutine is terminated at the step (003), the "AF control" subroutine of a step (004) is executed.

Figure 2B:
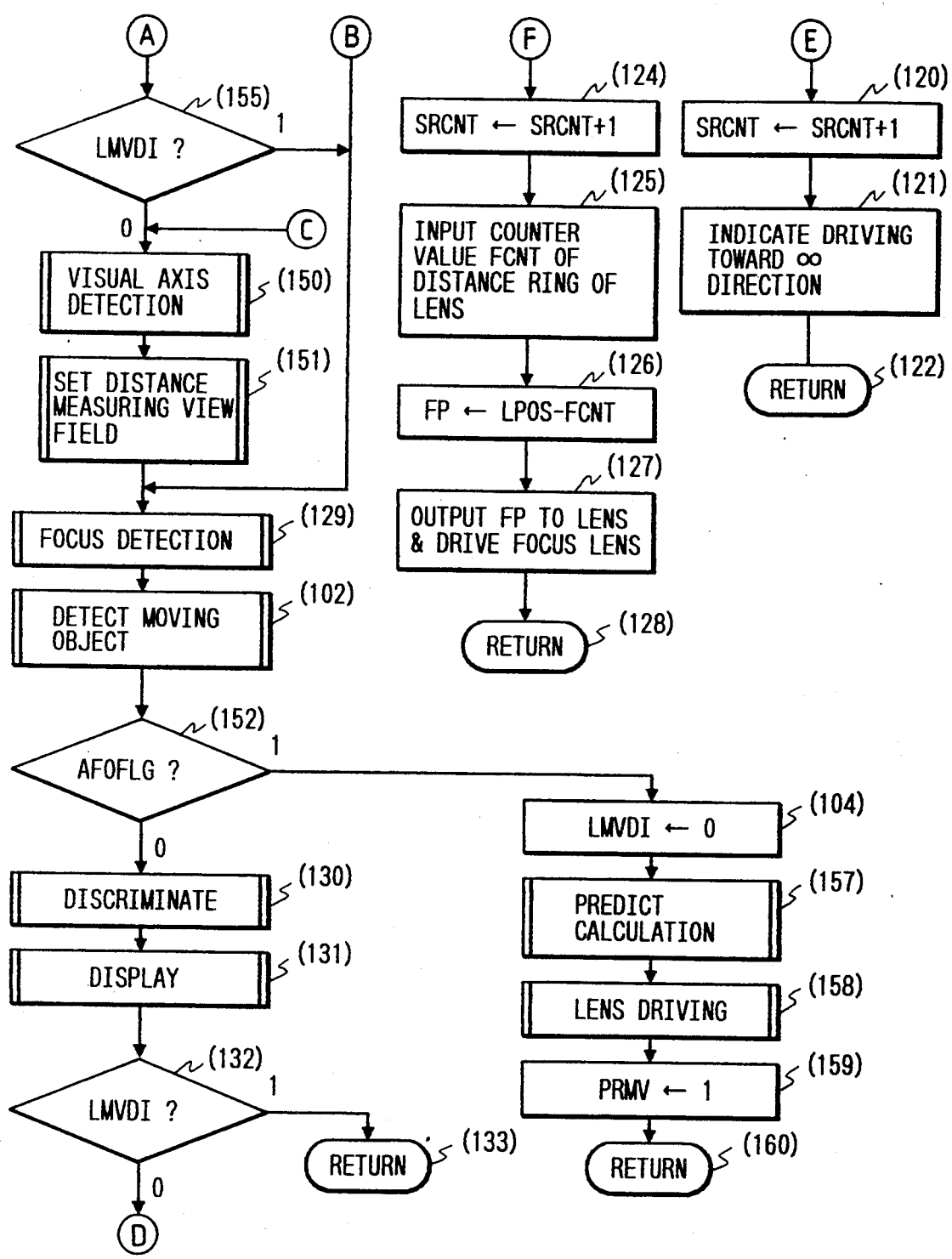
FIG. 2 (comprising FIGS. 2A, 2B, and 2C) is a flow chart for illustrating a control operation according to an embodiment of the present invention.
Figure 2C:
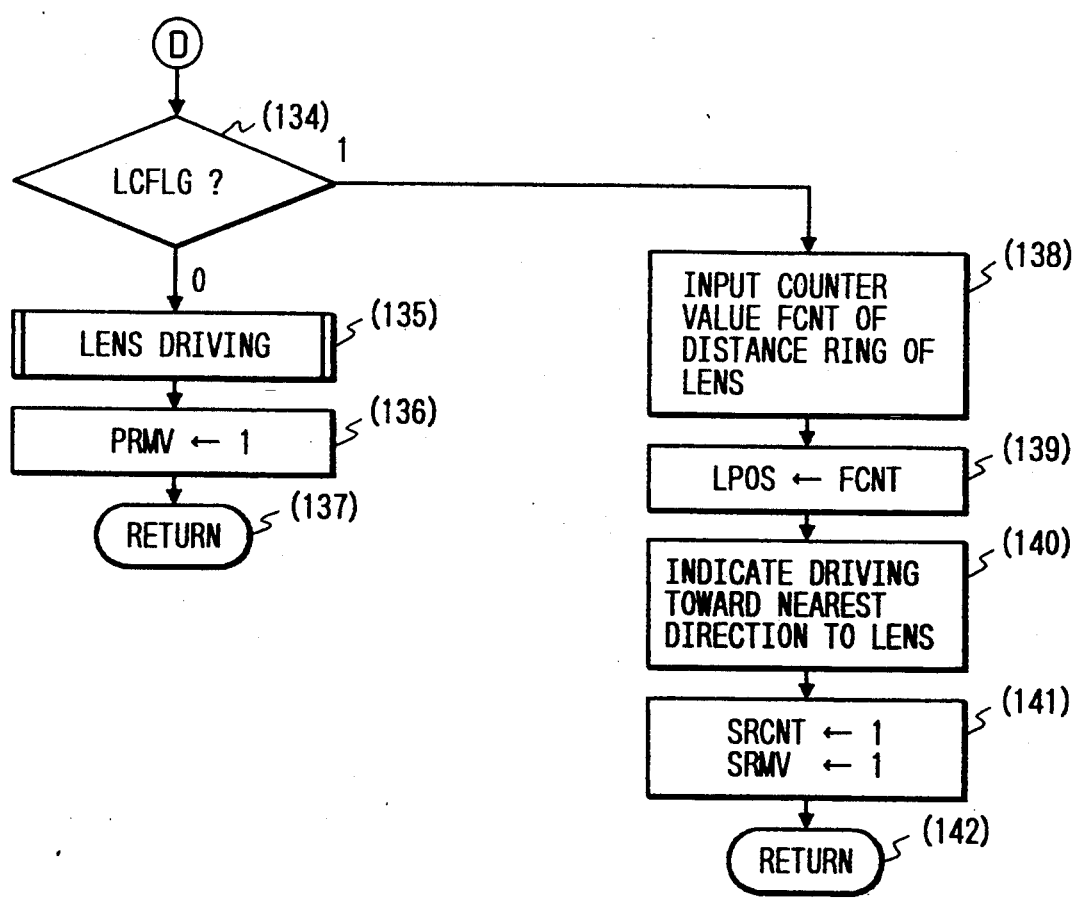

FIG. 2 shows a flow chart of the "AF control" subroutine.

First, at a step (108), the state of a flag PRMV is discriminated. PRMV, as will be described later, is a flag concerned in lens control, and more particularly, a flag set to 1 when lens driving is effected in the last "AF control". Since a description will now be given of the switch SW1 being on an first flow, the flag PRMV is 0, and shift is made to a step (112).

At the step (112), the state of a flag SRMV is detected, and SRMV also is a flag concerned in lens control, and since now SRMV=0, shift is made to a step (155). At the step (155), a flag LMVD1 is detected, and this flag also is 0 and therefore, shift is made to a step (150).

Figure 4:
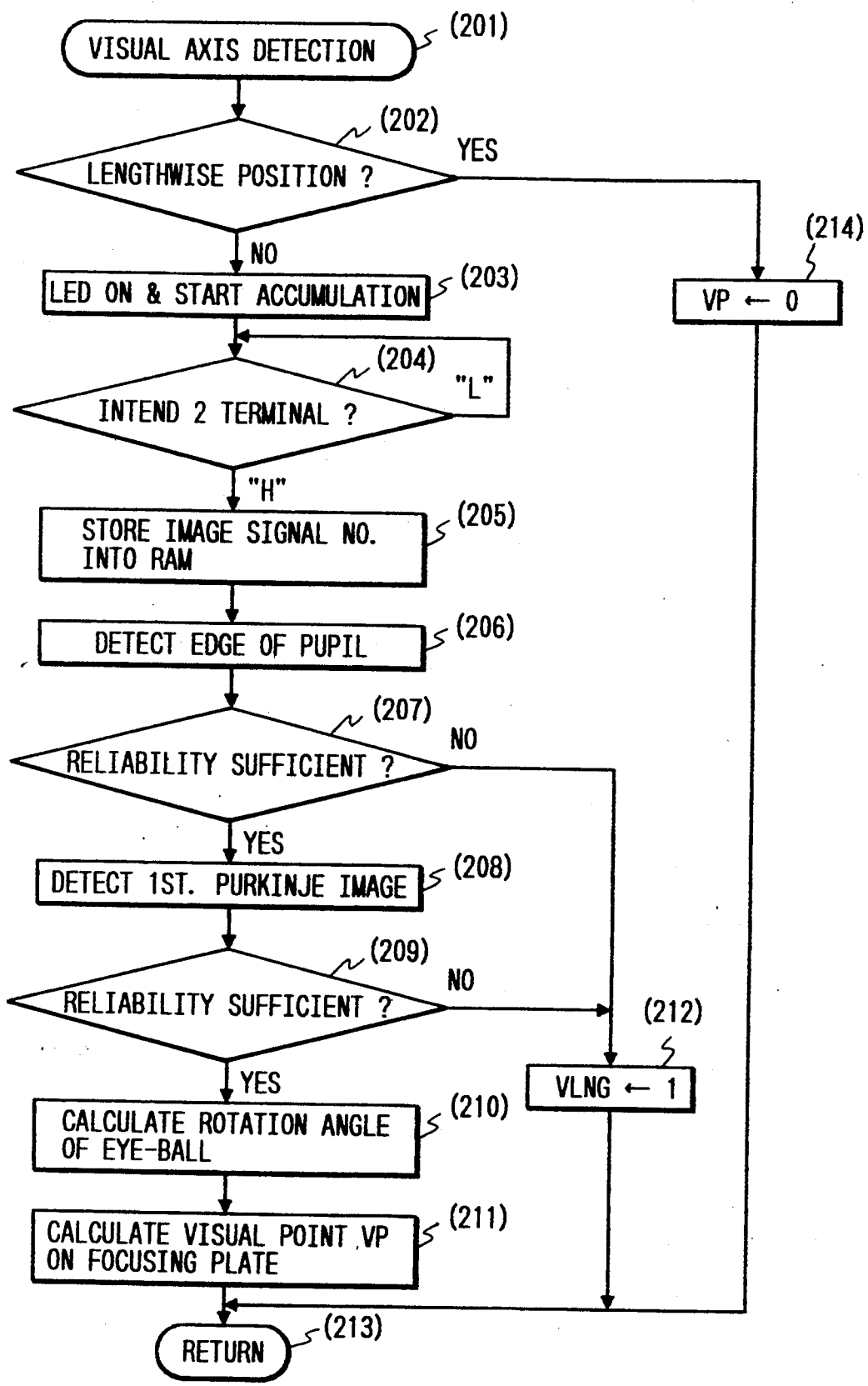
FIG. 4 is a flow chart for illustrating the subroutine of visual axis detection.

At the step (150), the "visual axis detection" subroutine is executed. This subroutine is shown in FIG. 4. Here, the position of the photographer's visual axis is detected. The details of this subroutine and the subsequent subroutine will be described later.

At a step (151), one of the three blocks (which include the nine distance measuring view fields shown in FIG. 17) which is nearest to the visual axis position is selected in accordance with the distance measuring view field range setting subroutine shown in FIG. 11 and on the basis of the result of the detection of the visual axis, and the stepping motor 121 is controlled to thereby set the opening in the movable mask 80 at a desired position.

Figure 5:
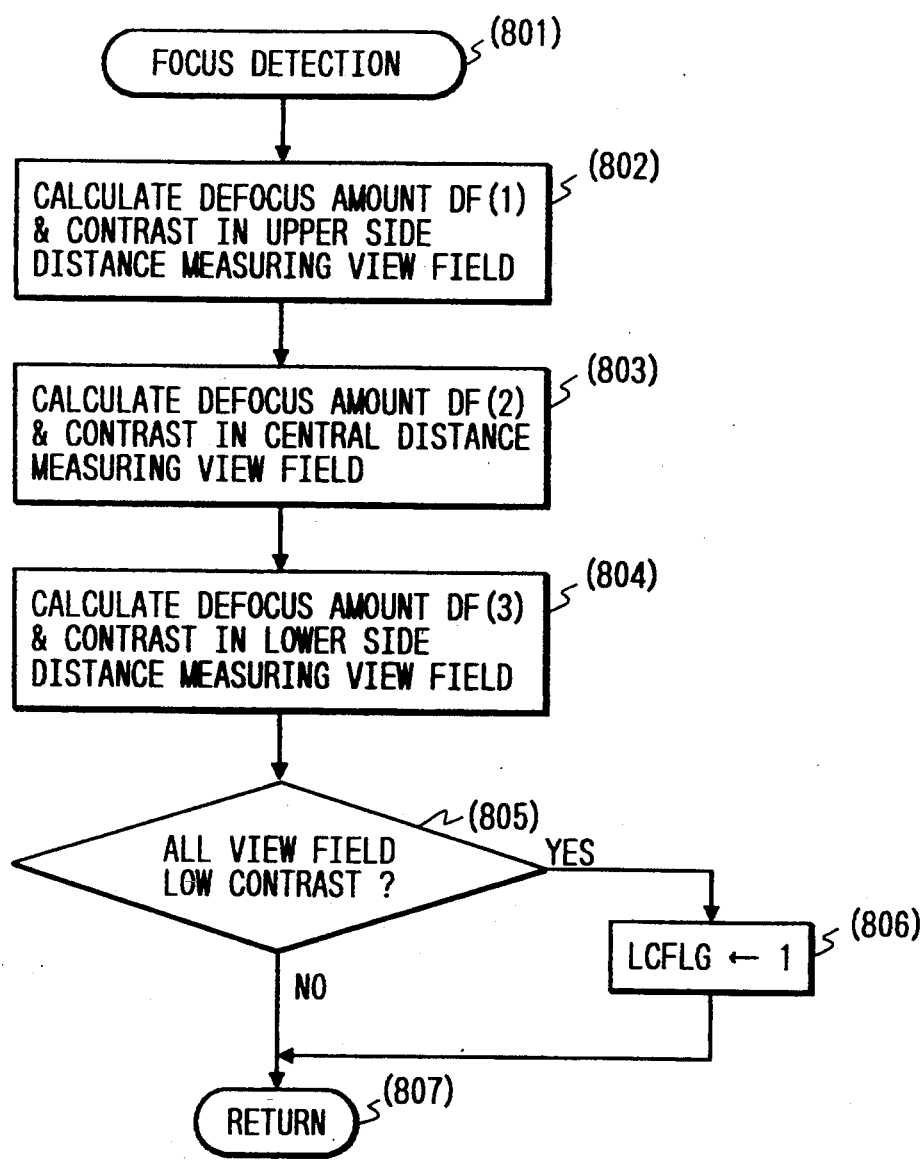
FIG. 5 is a flow chart for illustrating the subroutine of focus detection.

At the next step (129), the "focus detection" subroutine is executed. A flow chart of this subroutine is shown in FIG. 5, and in this subroutine, the focus state of the photographing lens is detected with respect to three distance measuring view fields.

Figures 3, 3A, 3B:
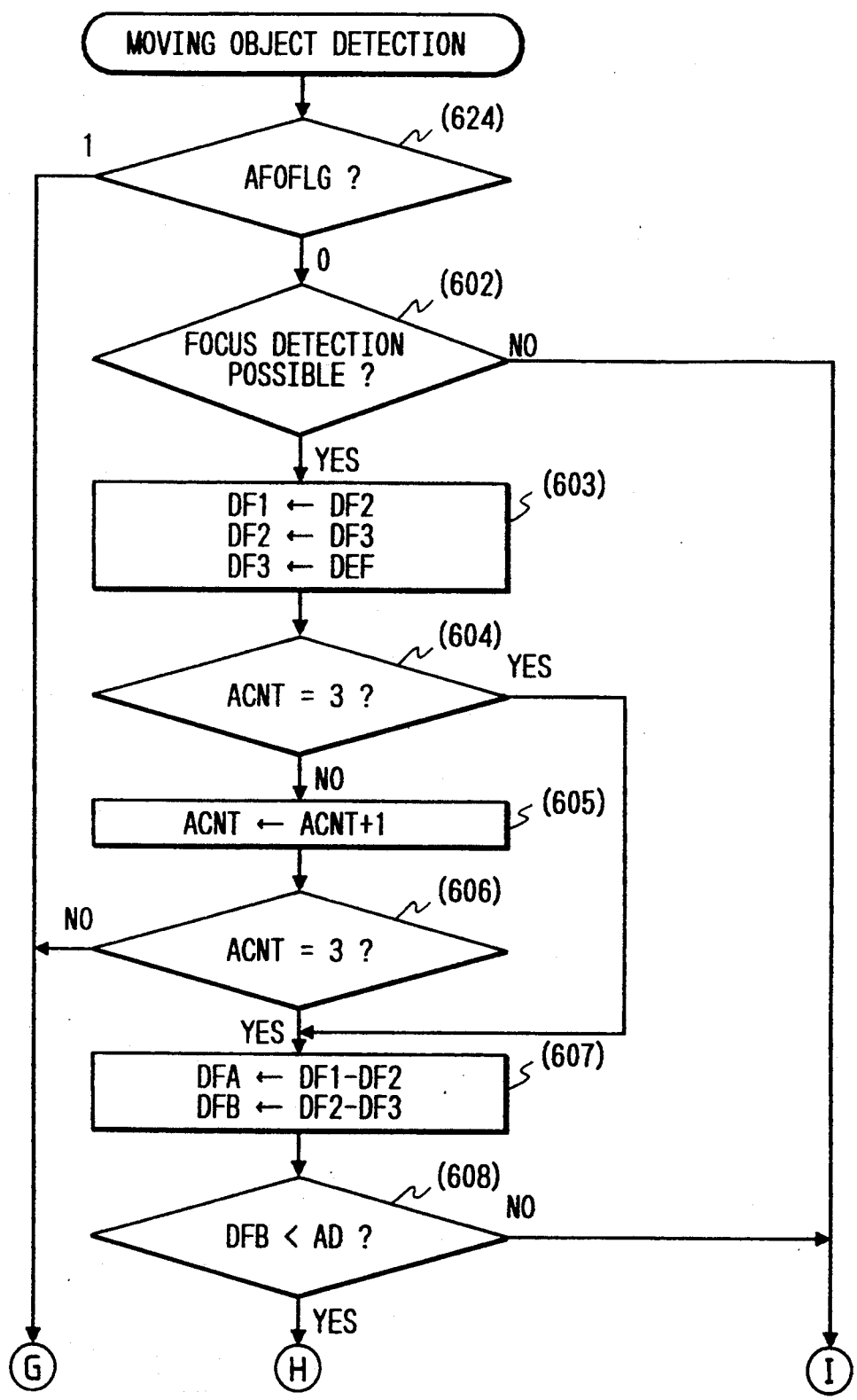
FIG. 3 (comprising FIGS. 3A and 3B) is a flow chart for illustrating the subroutine of moving object detection.

At the subsequent step (102), whether the object is moving or stationary is detected in the subroutine shown in FIG. 3 and the AF mode is set, but in the first flow, AFOFLG is cleared as the one shot mode and returned.

At a step (152), the state of the flag AFOFLG is detected, and in the first flow, this flag is 0 and therefore, a shift is made to a step (130).

Figures 7, 7A, 7B:
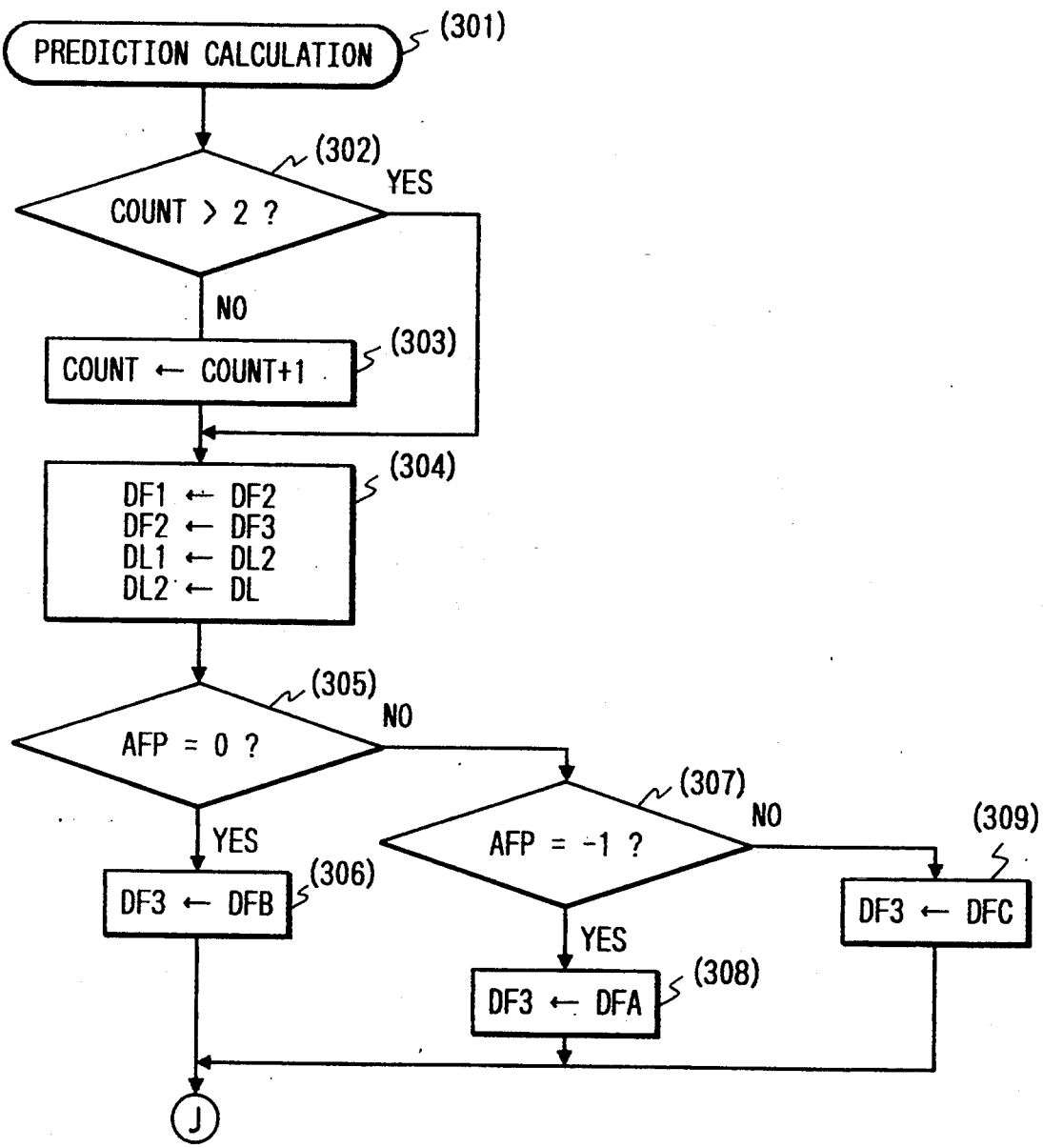
FIG. 7 (comprising FIGS. 7A and 7B) is a flow chart for illustrating the subroutine of prediction calculation.
Figure 7B:
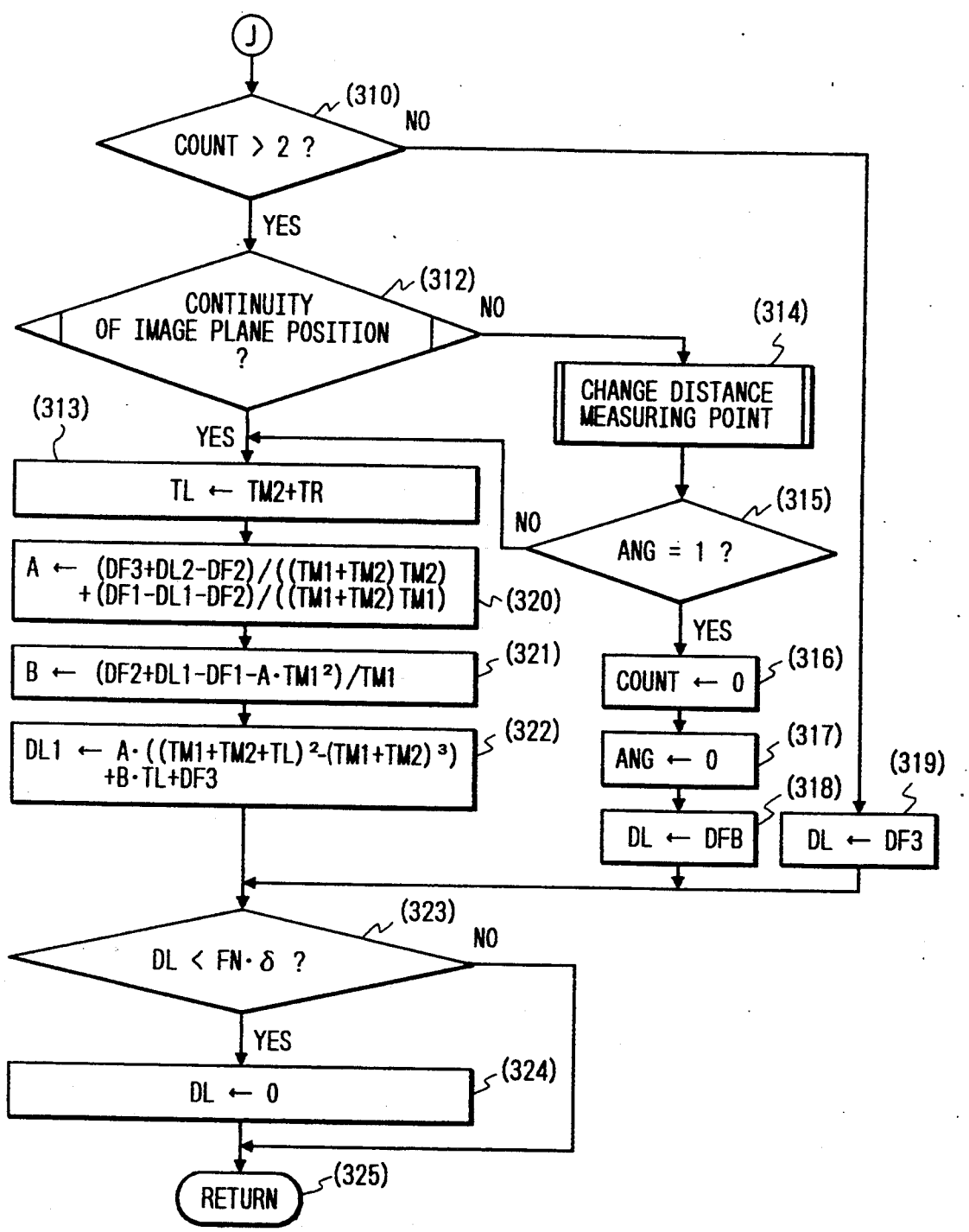

At the step (130), the "discrimination" subroutine is executed. A flow chart of this subroutine is shown in FIG. 7. The "discrimination" subroutine selects, on the basis of the result of the "focus detection" subroutine, one of the three distance measuring view fields which is used for focus adjustment and also discriminates the in-focus or the impossibility of focus detection and further, sets a lens driving prohibition flag LMVDI (104) to 1 when lens driving is not necessary.

At the next step (131), the "display" subroutine for displaying the in-focus or the impossibility of focus detection is executed. This communicates predetermined data to the display circuit DDR (FIG. 24) and causes the display device DSP to display the data, but this operation has nothing direct to do with the present invention and therefore need not be described in detail.

At a step (132), the state of the flag LMVDI is detected. As previously described, when lens driving is not necessary, LMVDI is set to 1 and therefore, if at the step (132), LMVDI=1, shift is made to a step (133), where the "AF control" subroutine is returned. If the flag LMVDI is 0, a shift is made to a step (134), where the state of a flag LCFLG is detected.

The flag LCFLG is set to 1 in the case of low contrast set in the "focus detection" subroutine of the step (129) and when the contrast of the image signal is lower than a predetermined value. If at the step (134), LCFLG is 0, it means that the contrast is sufficient to effect focus detection, and at a step (135), "lens driving" which will be described later is effected, whereafter at a step (136), a lens driving flag PRMV is set to 1, and at a step (137), the "AF control" subroutine is returned.

If at the step (134), LCFLG is 1, it means that the contrast is low, and a shift is made to a step (138).

The step (138) and subsequent steps are the first control flow of the so-called "search operation".

Now, at the step (138), the camera communicates with the lens and the count value FCNT of a "distance ring counter" for counting the amount of movement of the focus adjusting lens by the output pulse of an encoder operatively associated with the focus adjusting lens is input from the control device LPRS in the lens. This counter is reset to 0 at the start of the supply of the power source VL for the lens, and is determined such that the direction of axially forward movement is an up-count and the direction of axially backward movement is a down-count.

Accordingly, the position of the focus adjusting lens in the lens relative to the optical axis can be known from the count value FCNT of the distance ring counter.

At the next step (139), the count value FCNT is stored in the conversion area LPOS on the RAM in the microcomputer PRS. This count value represents the relative position of the lens when the search operation is started, and as will be described later, it is used to return the lens to the search starting lens position when an object of sufficient contrast cannot be detected by the search operation.

Subsequently, at a step (140), a "command for driving toward nearest direction" is delivered to the lens, whereby the search operation is started. In response to this command, the lens drives the focus adjusting lens in the nearest direction. This command is a command which does not designate the amount of driving, but simply indicates only the direction of driving, and when the focus adjusting lens comes to the mechanical limit of the nearest end, the control circuit LPRS in the lens detects it and the lens itself stops driving. The detection of the mechanical limit position is recognized by the time interval of the encoder pulse SENC. At a step (141), a variable SRCNT and a flag SRMV are set to 1. SRCNT is a variable representative of the state of the search operation, and is set to 0 when the search operation is not being performed, is set to 1 when the lens is being driven in the nearest direction, is set to 2 when the lens is being driven in the infinity direction, and is set to 3 when the lens is being driven toward the search starting lens position. Here, the lens is now driven in the nearest direction and therefore, the variable SRCNT is set to 1. SRMV is a flag representing that the lens driving for the search operation has been effected.

At the steps (138)–(141), the first control of the search operation is effected, and at a step (142), the "AF control" subroutine is returned.

When in FIG. 1, the "AF control" subroutine of the step (003) is terminated, the state of the switch SW1 is again discriminated at the step (002). If the switch SW1 is then opened, at the step (003), a "driving stop command" is delivered to the lens. That is, even if in the last "AF control" subroutine, some lens driving command is put out, when the switch SW1 is opened, the lens driving is stopped. Then, at the next step (005), all flags are cleared.

If at the step (002), the switch SW1 remains closed, the "AE control" subroutine of the step (003) is executed, whereafter at the step (005), the execution of the "AF control" subroutine is started again.

The flow of the "AF control" subroutine (FIG. 2) during the closing of the switch SW1 will hereinafter be described by case.

A description will first be given of a case where in the past "AF control" subroutine, the object was not of low contrast (flag LCFLG (134) is 0), but lens driving was effected (flag PRMV (108) is 1).

When the "AF control" subroutine is executed, at a step (108), the state of the flag PRMV is discriminated, and a shift is made to a step (109). At the step (109), the camera communicates with the lens and the information of the lens driving state is input from the control circuit LPRS in the lens. If here, predetermined driving is completed and the lens is already stopped, a shift is made to a step (110), where the flag PRMV is cleared, whereafter the new focus adjusting operation of a step (129) and subsequent steps is started. However, the handling of the determination of the distance measuring view field differs between the one shot mode and the servo mode, and if at a step (156), the flag AFOFLG is 1, a shift is made to a step (150), where visual axis detection is effected again, and if that flag is 0, shift is made to a step (129), where focus detection is effected in the same distance measuring view field range as that at the last time.

If the lens is not yet stopped, a shift is made to a step (111), where the "AF control" subroutine is returned. That is, the new focus adjusting operation is not performed until the amount of driving indicated to the lens at the step (135) of the past "AF control" is terminated.

A description will now be given of a case where in the last "AF control" subroutine, the object was of low contrast (flag LCFLG is 1) and the search operation was performed (flag SRMV is 1).

When the "AF control" subroutine is executed, at a step (112), the state of the flag SRMV is detected, and a shift is made to a step (113).

At the step (113), the information of the lens driving state is input from the lens, and if the lens is already stopped, a shift is made to a step (119), and if the lens is being driven, a shift is made to a step (153). As previously described, the search operation performs the following operations:

(1) To drive the lens in the nearest direction (variable SRCNT=1);

(2) To drive the lens in the infinity direction (variable SRCNT=2) if during the driving mentioned under item (1) above, any object having contrast cannot be found out and the focus adjusting lens arrives at the nearest side mechanical limit; and (3) To drive the lens to the search starting lens position (variable SRCNT=3) if during the driving mentioned under item (2) above, any object having contrast cannot be found and the focus adjusting lens arrives at the infinity side mechanical limit.

During the search operation, visual axis detection is effected without fail at the pre-stage of focus detection, and the distance measuring view field range is re-set each time visual axis detection is effected. This is because of the fact that in spite of the distance measuring view field range having been set on the basis of the visual axis position in the first flow, the result of focus detection was low contrast and the fact that the search operation was entered shows the possibility that the initial defocus of the photographing lens was very great and the photographer did not accurately perceive the object, and the result of visual axis detection in such a state is meaningless. The visual axis detection and distance measuring view field range setting subroutines at the step (153) and the step (154), respectively, comprise this operation.

At the subsequent step (114), the "focus detection" subroutine is executed. In this subroutine, the defocus amount and contrast of the object are detected. Subsequently, at a step (115), the state of a low contrast flag LCFLG is discriminated, and if LCFLG is 1 and the object is of low contrast, the "AF control" subroutine is returned at a step (117). That is, if the object is of low contrast when focus detection is effected in the search operation, nothing is done.

When it is judged that the flag LCFLG is 0 and the object is not of low contrast, a shift is made to a step (116), where a "driving stop command" is delivered to the lens. Subsequently, at a step (118), the flag SRMV is cleared, whereafter at a step (129), new focus adjustment control is effected. That is, when not low contrast, i.e., sufficient contrast to effect focus detection, is detected by the focus detection during the search operation, the lens is stopped to thereby terminate the search operation (render SRMV into 0), and new focus adjustment is effected in the same distance measuring view field range.

When no contrast cannot be detected in the operation mentioned under item (1) above, at a step (117), the "AF control" subroutine is returned each time the "AF control" subroutine is executed until the focus adjusting lens in the lens arrives at the nearest side mechanical limit.

When the lens arrives at the nearest end, at a step (113), the stoppage of the lens is detected and a shift is made to a step (119). Since a description will now be given of the case (1) above, a shift a step (120). In the case (2), a shift is made from the step (119) to the step (120), where a shift is made to a step (124). In the case (3), a shift is made to the step (118), where the search operation is terminated, and the cases (2) and (3) will be described later.

NOW, at the step (120), 1 is added to the variable SRCNT. This is for driving the lens, which has arrived at the nearest end, in the infinity direction, and at the next step (121), a "command for driving toward infinity direction" is delivered to the lens, whereby the above-mentioned search operation (2) is started. At a step (122), the "AF control" subroutine is returned. During the operation (2) as well, the control when no contrast is obtained, as in the case (1) described previously, is such that at the step (117), the "AF control" subroutine is returned each time the "AF control" subroutine is executed, and the case where contrast is detected is also similar to the case (1).

When the focus adjusting lens in the lens arrives at the infinity side mechanical limit, at the step (113), the stoppage of the lens is detected, and a shift is made to the step (123) via the step (119). Since now the search operation is the case (2), SRCNT is 2, and a shift is made from the step (123) to the step (124). At the step (124), 1 is added to the variable SRCNT, and from this onward, the search operation (3) is entered.

At a step (125), the aforementioned distance ring counter value FCNT is input, and at a step (126), the value of LPOS-FCNT is stored in a variable FP. The value of the distance ring counter when the search operation was performed is stored in the variable LPOS, and FP which is the result of this value minus the current counter value represents the distance ring counter value from the current lens position to the search starting position. This FP is delivered to the lens at a step (127), thereby commanding the lens driving of an amount FP in terms of the distance ring counter value. That is, the lens is driven to the search starting position. At a step (128), the "AF control" subroutine is returned. The control during the search operation (3) is similar to the cases (1) and (2) hitherto described.

When the focus adjusting lens arrives at the search starting position, at the step (113), the stoppage of the lens is detected, and via the steps (119) and (123), at the step (118), the flag SRMV is cleared and the search operation is terminated, whereafter at a step (129) and subsequent steps, a new focus adjusting operation is started.

A description will now be given of the second and subsequent AF control flows. For that purpose, the moving object detection subroutine of the step (102) will first be described in detail.

The moving object detection subroutine is shown in FIG. 3. This flow has the function of changing the AF mode into servo by detecting the continuous movement of the object on the image plane after the in-focus state is attained in the one shot mode or when the in-focus state is not attained in the one shot mode.

First, at a step (624), the state of the flag AFOFLG is detected, and if this flag is 1, a shift is made to a step (623), where the subroutine is immediately returned. This is for the purpose of preventing the return to the one shot mode once the servo mode has been entered, and is a measure for preventing the hunting phenomenon between the modes.

At a step (602), whether focus detection is possible in the distance measuring view field selected in the last flow is discriminated by the focus detection at the step (129) of FIG. 2, and if focus detection is possible, an advance is made to a step (603), and if not so, a shift is made to a step (620) to restore the moving object detecting operation to its initial state.

In the ensuing description, the defocus amount, in the last flow or the before-the-last flow, is the value of the selected distance measuring view field.

At the step (603), the defocus amount DF2 detected before the last time is input to DF3, the last defocus amount DF3 is input to DF2, and the current defocus amount DEF is input to DF3, whereby the renewal of data is effected. At the next step (604), whether focus detection could be effected three times on end is discriminated, and if ACNT=3, a shift is made to a step (607), and if not so, a shift is made to a step (605).

At the step (605), the counter ACNT is counted up by 1, and a shift is made to a step (606). At the next step (605), whether focus detection could be effected three times on end is discriminated again, and if ACNT=3, advance is made to the step (607), where the moving object detecting operation is performed, and if not so, a shift is made to a step (623), where this subroutine is returned.

At the step (607), the defocus variation amount DFA from the before-the-last focus detection till the last focus detection and the defocus variation amount DFB from the last focus detection till the current focus detection are calculated.

At the next step (608), whether the defocus variation amount DFB from the last focus detection till the current focus detection is smaller than a predetermined value AD is discriminated, and if DFB is smaller than AD, an advance is made to a step (609), and if not so, a shift is made to a step (620). So, if the defocus variation amount DFB is greater than the predetermined value AD, it is considered that the defocus amount has been varied not by the movement of the object, but by the entry of an obstacle into the view field or a change of the framing, and in such a case, a shift is made to the step (620) to reset the moving object detecting operation. A value of the order of 0.5 mm is used as an example of the value of AD, but if the above-described discrimination is done by a defocus variation speed taking the element of time into account, the influence of the time interval of focus detection can be eliminated and thus, more accurate discrimination will become possible.

At the step (609), the focal length of the photographing lens is input to LF2, and at the next step (610), the rate of variation AIZ in the focal length LF1 of the photographing lens at a point of time whereat the in-focus state has been attained and the current focal length LF2 of the photographing lens is calculated.

At a step (611), whether the rate of variation AIZ in the focal length calculated at the step (610) is smaller than 0.2 is discriminated, and if AIZ is smaller than 0.2, a shift is made to a step (612), and if not so, an advance is made to a step (620), where the moving object detecting operation is reset. When the rate of variation in the focal length is great, that is, when the photographing lens is partially focused or is greatly zoomed by a zoom lens or the like, the defocus amount may be varied by zooming, and this step is for preventing the object from being judged as a moving object by mistake due to such a defocus variation.

At the step (612), whether the values of the defocus variation amounts DFA and DFB are equal to each other is discriminated, and if DFA/DFB>0, it is judged that they are in the same direction, and a shift is made to a step (613), and if not so, an advance is made to the step (620), where the moving object detecting operation is reset. If the object is moving in one direction, the directions in which the defocus amounts vary are also the same, whereby the object is judged as a moving object, and if not so, each parameter is reset to effect the detection of a moving object over again.

At a step (613), a parameter MOVECNT for effecting the discrimination of a moving object is counted up by 1, and an advance is made to a step (614).

At the step (614), whether the defocus variation amount DFB is greater than a predetermined value BD is discriminated, and if DFB is greater than BD, an advance is made to a step (615), and if not so, a shift is made to a step (616). At the step (615), the parameter MOVECNT is counted up by 1, and a shift is made to the step (616). This is for increasing the count speed of MOVECNT for an object of which the defocus variation amount DFB is greater than the predetermined value BD (e.g. 0.08 mm), that is, which is rapid, and quickening the a shift to servo control. In this discrimination, if use is made of any other parameter than the defocus variation amount, for example, the defocus variation speed, the influence of the time interval of focus detection can be eliminated, and more accurate discrimination can be accomplished.

At the step (616), whether the defocus amount DF3 detected this time is greater than a predetermined value CD (e.g. 0.2 mm) (rear focus) is discriminated, and if DF3 is greater than CD, an advance is made to a step (617), and if not so, a shift is made to a step (618). At the step (617), MOVECNT is counted up by 1, and an advance is made to a step (618). Here, if the object lying at the center of the image field becomes rear-focused beyond a certain degree, the count-up speed of MOVECNT is made faster to quicken the a shift of the servo control.

At the step (618), whether the parameter MOVECNT of the moving object discrimination is 6 or greater is discriminated, and if MOVECNT is 6 or greater, the object is judged as a moving object, and a shift is made to a step (619), and if not so, an advance is made to a step (623), where this subroutine is returned.

At the step (619), 1 is input to AFOFLG to servo-control the control mode of in-focus detection, and at the step (623), this subroutine is returned. Steps (620)–(622) are for restoring the moving object detecting operation to its initial state, and at the step (620), ACNT for counting the frequency of focus detection is reset, and at the next step (621), the current focal length of the photographing lens is input to LF1. At the step (622), MOVECNT is reset, and at a step (623), this subroutine is returned. This subroutine is repeated until the object is detected as a moving object or the release switch SW2 is closed or the switch SW1 is opened.

Also, 1 is set in a lens driving prohibition flag LMVDI until 1 is set in AFOFLG in the above-described moving object detection subroutine after the in-focus is once attained by the flow of FIG. 2, and subsequent to a step (155), a step (129) is executed, and the detection of a moving object based on the result of the focus detection of the same distance measuring view field is effected without visual axis detection being effected.

When it is detected that the object is a moving object and 1 is set in AFOFLG, at a step (152), the program branches off and a shifts to a step (104). At the step (104), the lens driving prohibition flag LMVDI is cleared, and subsequently at a step (157), the calculation of the predictive driving of the photographing lens necessary for the servo operation is effected.

At a step (158), lens driving based on the predictive calculation is effected, and at a step (159), 1 is set in the flag PRMV, and at a step (160), the subroutine is returned.

The flow chart of the "visual axis detection" subroutine of FIG. 4 will now be described.

First, at a step (202), the state of the switch SWC for detecting the vertical and horizontal positions of the camera shown in FIGS. 23 and 24 is detected to thereby discriminate the posture of the camera. If as a result, the camera is in its vertical position, the visual axis detecting operation is not performed and a shift is made to a step (214). If the camera is in its horizontal position, a shift is made to a step (203), where visual axis detection is started. At a step (214), 0 which means being on the optical axis is input to the visual axis VP, and at a step (213), return is made.

At the step (203), the LED (13 in FIG. 12) is turned on to illuminate the eyeball and at the same time, the accumulation in the photoelectric conversion element SA (14 in FIG. 12) for visual axis detection is started. More specifically, the controller PRS of FIG. 15 delivers an accumulation starting command to the sensor driving circuit SDR2, which renders the clear signal CLR of the photoelectric conversion element SA into "L" and thus, the accumulation of charges is started.

At a step (204), the state of the input terminal INTEND2 of PRS is detected, and whether the accumulation has been terminated is examined. The sensor driving circuit SDR2 renders the signal INTEND2 into "L" simultaneously with the start of the accumulation, monitors signals AGC and SAGC2 from SA, renders the signal INTEND2 into "H" when the signal SAGC2 reaches a predetermined level, and at the same time, renders a charge transfer signal SH2 into "H" for a predetermined time, and transfers the accumulated charges to a CCD portion.

If at the step-(204), the terminal INTEND2 is "H", it means that the accumulation has been terminated, and a shift is made to a step (205), and if the terminal INTEND2 is "L", it means that the accumulation is not yet terminated, and the step (204) is executed-once more.

At a step (205), the A/D conversion of a signal AOS2 obtained by amplifying the image signal OS2 of the photoelectric conversion element SA by the sensor driving circuit SDR2 and the storage of the digital signal into the RAM are effected. More particularly, SDR2 produces CCD driving clocks $\phi 21$ and $\phi 22$ in synchronism with the clock CK2 from PRS and gives them to the control circuit in SA, SA has its CCD portion driven by $\phi 21$ and $\phi 22$, and the charges in the CCD are time-serially output as an image signal from an output OS2. This signal is amplified by an amplifier in SDR2, whereafter it is input as AOS2 to the analog input terminal of PRS. PRS effects A/D conversion in synchronism with a clock CK2 being output by PRS itself, and stores the digital image signals after A/D-conversion successively into the predetermined addresses of RAM.

At a step (206), the edge of the pupil is detected on the basis of the information of the eyeball obtained at the step (205). As previously described, this is accomplished by extracting a picture element which produces an output approximate to a half of the average output of the iris portion.

At a step (207), the reliability of the result of the detection of the pupil diameter is judged from the contrast value of the image obtained during the process of the step (206), and the difference between the foreseen pupil diameter calculated from the finder brightness corresponding to the output of SPC (FIG. 21) and the detected pupil diameter. The foreseen pupil diameter is the standard value of the pupil diameter contracted or expanded in conformity with the brightness of the outside. That is, accumulation is effected during the jumping movement of the eyeball, thereby eliminating a case where the image of the pupil is not clear-cut, a case where a reduction in the image output by eyelashes is taken for the pupil, etc. If it is judged that the reliability is sufficient, a shift is made to a step (208), and if it is judged that the reliability is insufficient, a shift is made to a step (212).

Subsequently, at the step (208), the extraction of the first Purkinje image is effected. This is accomplished by detecting the brightness peak appearing on the pupil or the iris.

At a step (209), the contrast of the detected first Purkinje image is compared with a predetermined value, thereby detecting a° case where the ghost light from spectacles overlaps the Purkinje image or a case where the Purkinje image wanes by a half due to blinking, and in such a case, with the reliability being judged to be insufficient, the program branches off to the step (212), and when the reliability is sufficient, a shift is made to a step (210).

At the step (210), the rotation angle of the eyeball is calculated on the basis of expression (2).

At a step (211), the visual point (line) VP on the focusing plate is calculated from the rotation angle of the eyeball obtained at the step (210) and the fixed value of the finder optical system, and at a step (213), the subroutine is returned.

The design is such that at the step (212) to which the program has branched off when the reliability has been judged to be insufficient in the extraction of the first Purkinje image and the pupil edge, 1 is set in a graph VLNG representative of the impossibility of visual axis detection and at the-step (213), the subroutine is returned.

A flow chart of the "distance measuring view field range setting" subroutine is shown in FIG. 11. This subroutine determines which of the three blocks (each having distance measuring view fields) should be selected, on the basis of the result of visual axis detection.

First, at a step (902), the state of a visual axis detection impossibility flag VLNG set in the visual axis detection subroutine is detected, and if VLNG is 0, a shift is made to a step (903), and if VLNG is 1, the program branches off to a step (906), where the subroutine is returned. This means that when visual axis detection is impossible, the distance measuring view field range is set to the same position as the last flow.

At the step (903), the visual point VP information (the distance from the optical axis) on the focusing plate is compared with a predetermined value a, for example, a half of the finder view field, or 18 mm in a 35 mm camera. If the visual point VP information is greater than a, it is judged that the photographer has seen photographing information other than the object image, and the setting of the distance measuring view field range based on the visual axis position at this time is not effected, and at the step (906), return is made.

At a step (904), the distance measuring view field range closest to the visual point VP is selected from among three.

At a step (905), the stepping motor MTR3 for moving the movable mask 80 is drive-controlled to enable the focus detection in the selected view field range to be effected.

A flow chart of the "focus detection" subroutine is shown in FIG. 5.

At steps (802)–(804), the defocus amounts DF(1), DF(2) and DF(3) of the photographing lens and the contrast of the image signal are calculated with respect to the upper, central and lower distance measuring view fields in the selected block.

At a step (805), if the contrasts calculated at the steps (802)–(804) are all below a predetermined value, the program branches off to a step (806). Also, if any one of those contrasts is above the predetermined value, a shift is made to a step (807), where the subroutine is returned.

A description will now be given of the "discrimination" subroutine and the "prediction calculation" subroutine. These are subroutines in which after a distance measuring view field block is determined by the result of visual axis detection, the information of a plurality of distance measuring view fields within that range is used for focus adjustment, and these subroutines are used properly in conformity with the focus adjusting operation mode of the camera.

Figure 6:
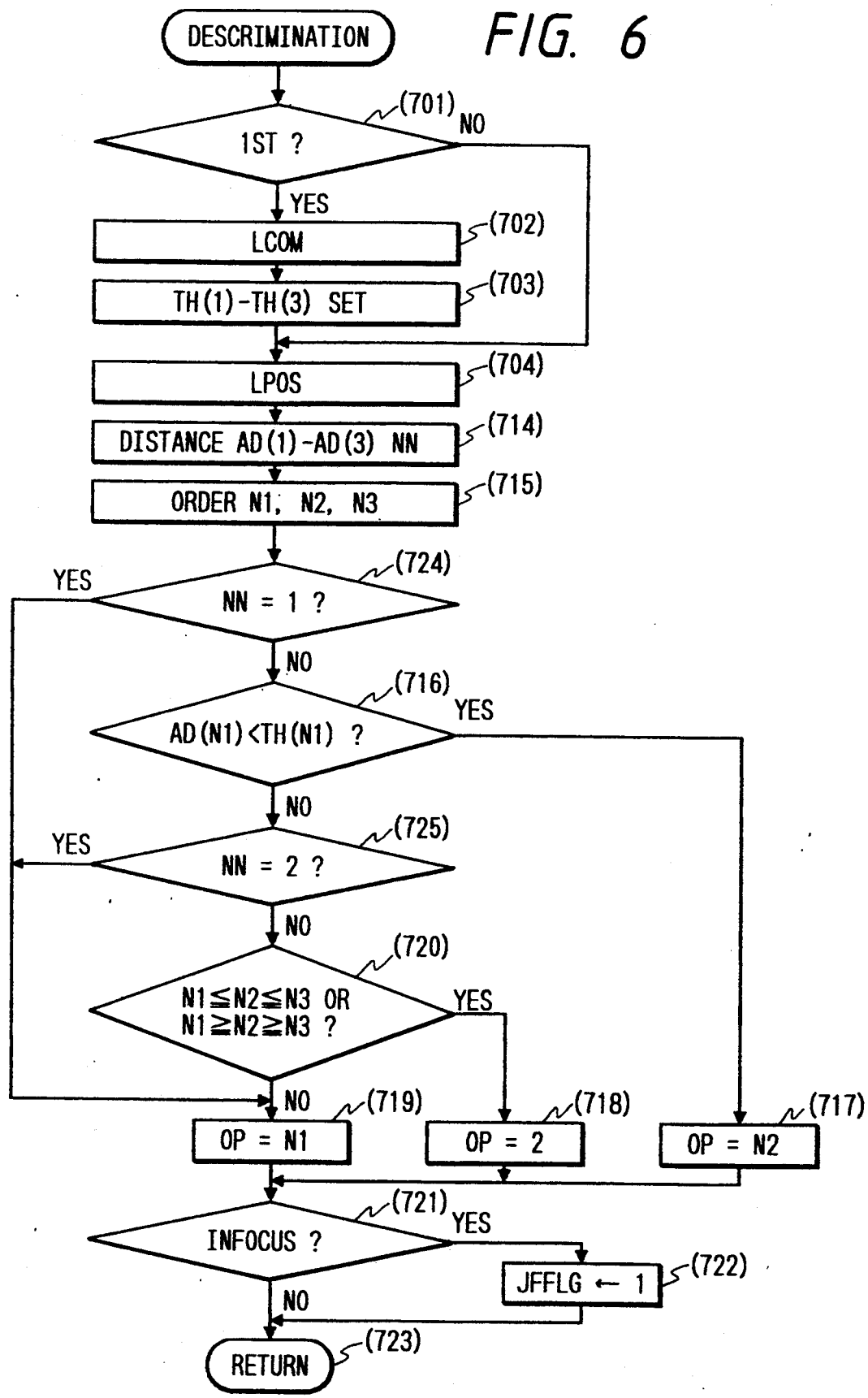
FIG. 6 is a flow chart for illustrating the subroutine of discrimination.

A description will first be given of the flow chart of the "discrimination" subroutine shown in FIG. 6.

At a step (701), whether the calculation is the first distance measurement calculation is, discriminated. If it is the first distance measurement calculation, an advance is made to a step (702), and if not so, the program branches off to a step (704).

At the step (702), communication is effected with the lens FLNS and the information of the lens is input to the microcomputer. Various kinds of information such as the focal length, the closest distance, the sensitivity coefficient and the pitch of comb-teeth are read from the lens.

At a step (703), the closest threshold values are calculated (TH(1), TH(2), TH(3)) by distance measuring view fields on the basis of the information read at the step (702).

Different values from one distance measuring point to another are set as these threshold values. For example, as the threshold values for the upper and lower distance measuring points, $$TH(1)=TH(3)=20f$$

is set by the then focal length f of the lens. As the threshold value for the central distance measuring point, a value closer than the threshold values of the upper and lower distance measuring points, for example, $$TH(2)=10f$$

is set. This takes into account that an object which is not intended by the photographer rarely comes into the center of the image field or the short distance. Further, when it is supposed that a microlens is in a close-up state, this threshold value is multiplied by a predetermined magnification (smaller than 1) to thereby reduce the threshold value.

At a step (704), if there is not the information of the absolute position in a lens which reads the current absolute lens position (focus value) from the lens, the lens is once brought to the-infinity end at a suitable time such as the time when the power source is ON, and the movement of the lens thereafter is memorized in a predetermined memory, whereby the current lens position can be found.

At a step (714), with respect to the distance measuring view field in which the contrast has been above a predetermined value, the absolute distances AD(-1)—AD(3) of respective distance measuring points at which focus detection is being effected are found from the defocus amounts DF(1)–DF(3) and the lens position memorized by S4. Also, the-number of the absolute distance data is memorized in NN.

At a step (715), AD(1)−AD(3) are compared with one another and are ordered from a shorter distance. The distance measuring point number of the shortest distance of AD(1)–AD(3) is put into N1, the distance measuring point number of the second shortest distance is put into N2, and the distance measuring point number of the longest distance is put into N3.

At a step (724), if NN=1, the program branches off to a step (719).

At a step (716), one of the distance-measured points which is the shortest distance is compared with the threshold values. Since at the step (715), the distance measuring point number (N1) of the shortest distance has been found, the measured distance of the distance measuring point N1 is compared with the threshold values AD(N1) and TH(N1). If the measured distance AD(N1) is smaller than the threshold value TH(N1), the program branches off to a step (717). If AD(N1) is greater than TH(N1), the program branches off to a step (720).

If at a step (725), NN=2, the program branches off to a step (719).

At the step (720), whether the measured distance is continuously longer is discriminated. The distance measuring points are given numbers in order from above and therefore, if N1–N3 arranged in the order of shorter distance are arranged in order of magnitude, it can be judged that the measured distance is continuously longer. If the measured distance is continuously longer, the program branches off to a step (718), and if not so, the program branches off to a step (719).

The step (717) is a case where the short distance point is smaller than the threshold values and therefore, the second shortest distance point is selected. The distance measuring point number N2 of the second distance is memorized in OP.

If at the step (718), objects are continuously arranged, the distance measuring point is selected to the center (distance measuring point number 2). The selected distance measuring point number 2 is memorized in OP.

The step (719) memorizes the shortest distance point in OP if the program does not branch off to this step by the discrimination at the step (716) and the step (720).

At a step (721), when the selection of the selected point is terminated, whether the selected distance measuring point is in focus is discriminated. If it is in focus, the program branches off to a step (722), and if it is not in focus, the program branches off to a step (723).

At the step (723), an in-focus flag JFFLD is set to 1, and at the step (723), the subroutine is returned.

The flow of the "prediction calculation" subroutine will now be described with reference to FIG. 7. FIG. 7 shows the flow of the "prediction calculation" subroutine in which the propriety of prediction calculation is discriminated and if prediction is possible, the amount of lens driving taking an AF time lag and a release time lag into account is calculated.

A step (302) discriminates whether a counter COUNT (for discriminating whether the accumulation of data necessary for prediction has been completed) should be counted up. In the present embodiment, if distance measuring data and lens driving data for three or more times are accumulated, that is, if COUNT>2, prediction calculation is possible and any further count-up is not necessary and therefore, if COUNT>2, an advance is made to a step (304). Also, if COUNT<3, the counter COUNT is counted up at a step (303), whereafter an advance is made to the step (304).

At the step (304), the renewal of data for the current prediction calculation is effected. That is, prediction calculation is effected on the basis of expressions (6), (7), (8) and (9) in Japanese Laid-Open Patent Application No. 1-288816 and therefore, as the data, there are required the last and before-the-last defocus amounts DF2 and DF1, the last amount of lens driving DL1, the current amount of lens driving DL2, the before-the-last and last time intervals TM1 and TM2 and the estimated time lag TL in FIG. 2. Consequently, at the step (304), each time focus detection is effected, the last defocus amount and the before-the-last defocus amount are input to a memory area DF2 and a memory area DF1, respectively, and further, the amount of lens driving DL as converted into the last amount of image plane movement and the amount of lens driving DL1 as converted into the before-the last amount of image plane movement are input to a memory area DL2 and a memory area DL1, respectively, and the data in each memory area is renewed to data necessary for the current prediction calculation.

At a step (305), whether AFP representative of the position of the distance measuring point being used is "0" is discriminated. If AFP is "−1", it shows that the lower distance measuring view field is being used, and if AFP is "0", it shows that the central distance measuring point is being used, and if AFP is "1", it shows that the upper distance measuring view field is being used. That is, at the step (305), whether the central distance measuring view field is being used is discriminated, and if the central distance measuring view field is being used, a shift is made to a step (306), and if not so, a shift is made to a step (307).

At the step (307), as at the step (305), whether the lower distance measuring view field is being used is discriminated, and if the lower distance measuring view field is being used, a shift is made to a step (308), and if the upper distance measuring view field is being used, a shift is made to a step (309).

At the steps (306), (308) and (309), the defocus amount measured this time in the distance measuring view field used this time is input to a memory area DF3 in the RAM, and the renewal of data is effected. At the step (306), the defocus amount DFB based on the image signal of the sensor in the central distance measuring view field is input, and at the step (308), the defocus amount DFA based on the image signal of the sensor at the lower distance measuring point is input, and at the step (309), the defocus amount DFC based on the image signal of the sensor at the upper distance measuring point is input. When these steps are terminated, a shift is made to a step (310).

At the step (310), whether the data necessary for prediction calculation are input to the above-mentioned memory areas is discriminated. As described above, prediction calculation requires the current, last and before-the-last defocus amounts and the last and before-the-last amounts of lens driving, and is subject to the condition that three or more focus adjusting operations have been performed in the past. Consequently, each time the focus adjusting operation is performed at the step (303), +1 is effected on the counter COUNT, and the counter is caused to count the number of times over which the focus adjusting operation has been performed, and whether that number of times is greater than 2, that is, whether three or more operations have been performed, is discriminated, and if three or more focus adjusting operations have been performed and prediction calculation is possible, a shift is made to a step (312), and if prediction calculation is impossible, a shift is made to a step (319).

At the step (312), whether the defocus amount renewed this time is suitable for prediction is judged with respect to the "continuity of the image plane position", and if it is judged that there is continuity, a shift is made to a step (313), and if not so, a shift is made to a step (314). The method of judging the "continuity of the image plane position" will be described later.

If at the step (312), it is judged that there is not the continuity of the image plane position and a shift is made to the step (314), at this step, the distance measuring view field used in the "distance measuring view field change" subroutine is changed. The details of this subroutine will also be described later.

At a step (315), the distance measuring view field is changed, whereafter whether it has become foreseeable by ANG is discriminated, and if it is foreseeable, a shift is made to the step (313), and if it is unforeseeable (inappropriate data), a shift is made to a step (316).

At the step (316), the counter COUNT which counts the number of times over which the accumulation of data has been done is reset to discontinue prediction control once. Then, at a step (317), the flag ANG for discriminating the possibility or impossibility of prediction is reset.

At a step (318), the defocus amount DFB of the central distance measuring view field is input to the amount of lens driving DL as converted into the amount of image plane movement. This means that if the distance measuring view field becomes unforeseeable, the distance measuring view field to be used when AF-is started again is the central distance measuring view field, whereas this need not be the central distance measuring view field, but use may be made, for example, of the distance measuring view field selected at first or the distance measuring view field used lastly.

Also, in the first and the second distance measurement, a shift is made to a step (319), where the defocus amount DF3 renewed this time is input to the amount of lens driving DL as converted into the amount of image plane movement.

Also, if at the step (312), it is judged that the distance measuring view field is foreseeable and a shift is made to the step (313), the calculation of the estimated time lag TL is effected at the step (313). As previously described, the time from the last focus detecting operation till the current focus detecting operation is memorized in the memory area TM2, and under the assumption that the time required for the current focus adjustment also is coincident with TM2, the estimated time lag TL=TM2+TR is found. Here, TR is the release time lag.

At the next steps (320) and (321), A and B representative of the terms a and b of expressions (6) and (7) are found on the basis of data stored in the memory areas DF1–DF3, DL1, DL2, TM1 and TM2, and a shift is made to a step (322).

At the step (322), the calculation value of expression (9) of JP 1-288816 is found on the basis of the data in the respective memory means and the calculation values at the step (313) and the steps (320) and (321), and from this, the amount of lens driving DL as converted into the current amount of image plane movement is found.

At the next step (323), the amount of lens driving DL found at the steps (322), (318) and (319) is compared with the product FN·δ of the fully open F number FN of the photographing lens and a predetermined coefficient δ (in the present embodiment, 0.035 mm), and if DL<FN·δ, a shift is made to a step (324), and if not so, return is made at a step (325).

At the step (324), it is judged that at the previous step (323), the amount of lens driving DL is smaller than the image plane depth FN·δ, that is, lens driving is not necessary, and the amount of lens driving DL is-set to DL=0, and the driving of the lens is prohibited. Thereby, unnecessary minute lens driving is no longer effected, whereby both of the sense of use and the power consumption can be improved. Also, in the present embodiment, FN is used as the fully open F number of the photographing lens, but there is no problem even if this is used as the photographing aperture value, and δ is not limited to 0.035 mm. When this step is terminated, this subroutine is returned at the next step (325).

Figure 8B:
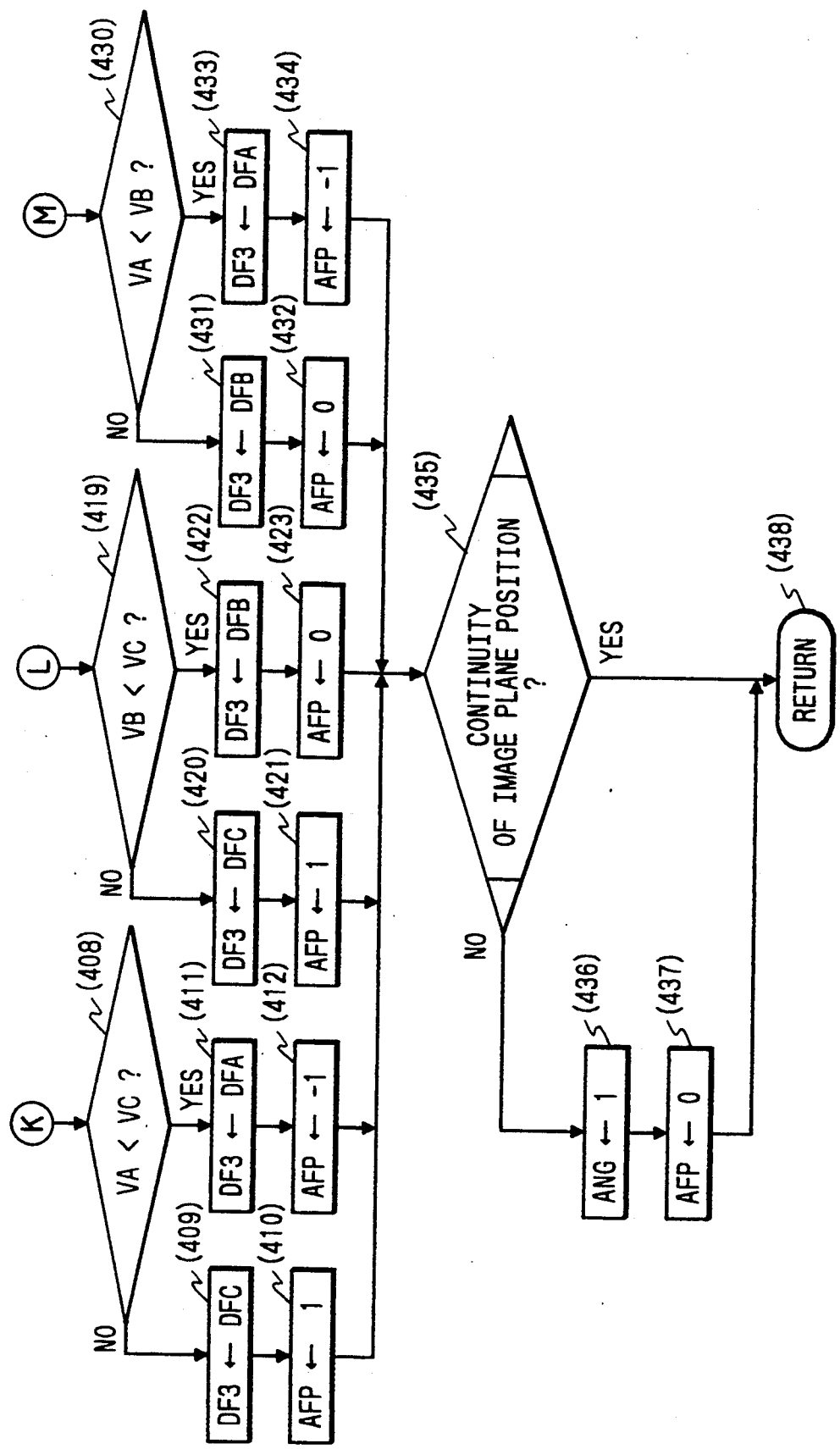
FIG. 8 (comprising FIGS. 8A and 8B) is a flow chart for illustrating the subroutine of changing the detection point.

The flow of the "distance measuring point change" subroutine will now be described with reference to FIG. 8. FIG. 8 shows the flow of the "distance measuring view field change" subroutine which is a subroutine in which since the defocus amount of the distance measuring view field selected this time has been judged to be not suitable for prediction control, that distance measuring view field is changed to another distance measuring point which is prediction-controllable.

At a step (402), whether the distance measuring view field used this time is the central distance measuring view field is discriminated by AFP, and if the central distance measuring view field is used, a shift is made to a step (403), and if not so, a shift is made to a step (413).

At the step (413), as at the step (402), whether the distance measuring view field used this time is the lower distance measuring view field is discriminated, and if the lower distance measuring view field is used, a shift is made to a step (414), and if the appear distance measuring view field is used, a shift is made to a step (425).

Steps (403)–(412), (414)–(423) and (425) (434) are steps at which a distance measuring view field being subjected to an image plane position variation approximate to the image plane position variation till the last time is selected from the defocus amounts of the other distance measuring view fields than the distance measuring view field used this time.

At the step (403), the image plane movement velocity V1 from the before-the-last distance measurement till the last distance measurement is calculated. At the next step (404), the image plane movement velocity V2 from the last distance measurement till the current distance measurement is calculated by the use of the defocus amount DFA of the left distance measuring view field.

At the step (405), the absolute value VA of the difference between V1 and V2 calculated at the steps (403) and (404), respectively, is calculated. This represents the difference between the image plane movement velocity V1 till now and the image plane movement velocity V2 in the left distance measuring view field, i.e., continuity, and the smaller is the value of VA, the higher is the continuity.

At the step (406), the image plane movement velocity V3 from the last distance measurement till the current distance measurement is calculated by the use of the defocus amount DFC of the upper distance measuring view field. At the step (407), as at the step (405), VC representative of the continuity when the upper distance measuring view field is used calculated.

At the next step (408), VA and VC which evaluate the continuity of the image plane position variation are compared with each other, land if VA<VC, that is, if the continuity in the lower distance measuring view field is higher, a shift is made to the step (411), and if not so, a shift is made to the step (409).

At the step (409), the defocus amount DFC of the upper distance measuring view field is input to the memory area DF3 on the RAM because the upper distance measuring view field is higher in continuity. At the step (410), "1" representative of the upper distance measuring view field is input to AFP representative of the distance measuring point used.

At the step (411), the defocus amount DFA of the lower distance measuring view field is input to the member area DF3 on the RAM because the lower distance measuring view field is higher in continuity. Then, at the step (412), "−1" representative of the lower distance measuring view field is input to AFP.

When the step (410) or (412) is terminated, a shift is made to a step (435). Also, the steps (414)–(423) and (425)–(434) likewise are steps for selecting a distance measuring point of high continuity approximate to the image plane position variation from the before-the-last time till the last time, and the operations thereof are similar to those of the steps (403)–(412) and need not be described in detail.

At the step (435), whether the continuity of the image plane position is suitable for prediction control is judged from the defocus amount of the changed distance measuring view field, and if it is suitable, a shift is made to a step (438), and if it is not suitable, a shift is made to a step (436).

At the step (436), "1" is input to a flag ANG which once discontinues prediction control, because in spite of the distance measuring view field having been changed to the best suited point, it has been judged that the distance measuring view field is not suitable for prediction control. Then, at a step (437), "0" is input to AFP to return the distance measuring view field used to the central distance measuring view field. When this step is terminated, a shift is made to a step (438), where this subroutine is returned.

In the above-described prediction calculation and distance measuring point change subroutines, when the continuity of the image is not found at the step (312) by the defocus data of the distance measuring point used at first, a distance measuring view field change is performed, and the defocus data in the distance measuring view fields of three distance measuring points which is highest in continuity is detected, and on the basis of this data, the discrimination between the presence and absence of continuity is done again at the step (435), and if continuity is found, prediction calculation based on said defocus data highest in continuity continues to be executed at the steps (313)–(322). At this time, the value of AFP indicative of the distance measuring point of said defocus data becomes a value conforming to the distance measuring point of that data, and the focus detection thereafter is effected in conformity with the defocus data from the changed distance measuring point and a change of the distance measuring point is done. Also at the step (435), if continuity is not found, ANG is set to ANG=1 and the prediction calculation is discontinued temporarily, and the lens driving by the data of the central distance measuring view field is effected.

Figure 9:
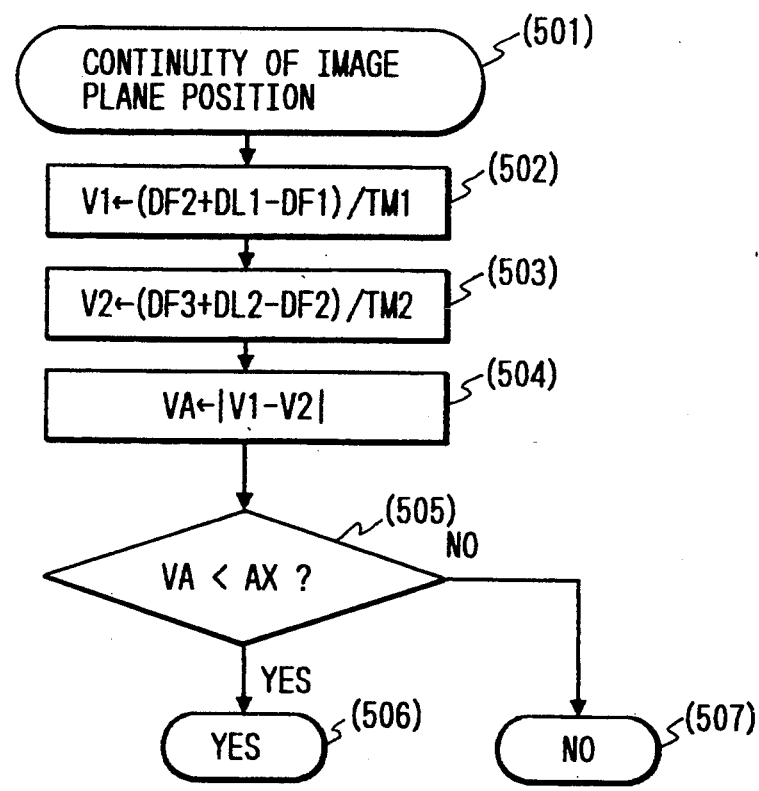
FIG. 9 is a flow chart for illustrating a subroutine regarding the continuity of the image plane position.

The "discrimination of the continuity of image plane position" subroutine will now be described with reference to FIG. 9.

At a step (502), a calculation (DF2+DL1−DF1)/TM1 is effected on the basis of the data of the respective memory areas. This calculation is a step for calculating the mean value V1 of the image plane movement velocity between the times $t_1$ and $t_2$ of FIG. 2. The calculation at the next step (503) likewise is a step for calculating the mean value V2 of the image plane-movement velocity between the times $t_2$ and $t_3$. Thereafter, an advance is made to a step (504).

At the step (504), the absolute value VA of the difference between the image plane movement velocities V1 and V2 found at the steps (502) and (503), respectively, is calculated, and a shift is made to a step (505).

At the step (505), VA found at the step (504) is compared with a preset number AX, and if VA is greater than AX, it is judged that the continuity of the image plane position is absent, and if VA is smaller than AX, it is judged that the continuity is present.

The principle of judgment as to the presence or absence of continuity by the above-described flow is based on the fact that if the same object is pursued, the then image plane movement velocity varies continuously. So, if image plane movement velocities adjacent to each other in terms of time are calculated and the difference therebetween is small, the image plane movement velocity is regarded as varying continuously, and it is judged that the same object is being distance-measured, and prediction calculation is effected. In contrast, if the variation in the image plane movement velocity is sufficiently great, the image plane movement velocity is regarded as not varying continuously.

Figure 10:
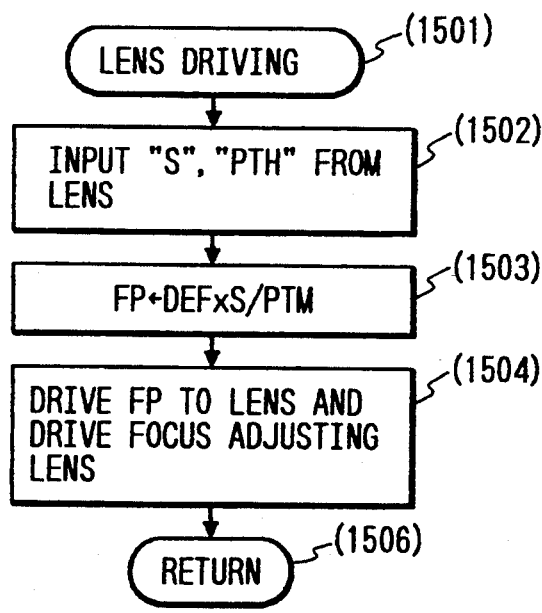
FIG. 10 is a flow chart for illustrating a subroutine regarding lens driving.

FIG. 10 shows a flow chart of the "lens driving" subroutine.

When this subroutine is executed, at a step (1502), communication is effected with the lens and two data "S" and "PTH" are input. "S" is the "coefficient of defocus amount vs. amount of axial movement of the focus adjusting lens" inherent to the photographing lens, and for example, in the case of a single lens of the totally axially moved type, the entire photographing lens is a focus adjusting lens and therefore, S=1, and in the case of a zoom lens, S varies depending on each zoom position. "PTH" is the amount of axial movement of the focus adjusting lens per output pulse of the encoder ENC operatively associated with the movement of the focus adjusting lens LNS in the direction of the optical axis.

Thus, the value of the amount of axial movement of the focus adjusting lens as converted into the output pulse number by the current defocus amount DEF of the photographing lens and said S and PTH, i.e., the so-called amount of lens driving FP, is given by the following equation:

$$FP = DEF \times S/PTH$$

A step (1503) executes the above equation as it is.

At a step (1504), FP found at the step (1503) is delivered to the lens to thereby command the driving of the focus adjusting lens (in the case of a single lens of the totally axially moved type, the entire photographing lens).

In the foregoing description, use has been made of an example in which three vertically independent distance measuring view fields exist in the selected distance measuring view field block, but alternatively, these distance measuring view fields may be replaced by a serial distance measuring view field comprising a plurality of distance measuring view fields put in a row, and this may be divided into the original plurality of areas and for example, the right, central and left areas may be replaced by the upper, central and lower areas, whereby a process similar to that described previously can be applied.

The embodiment hitherto described is shown as a passive type focus detecting apparatus, but may also be an active type focus detecting apparatus. On the other hand, where the closest distance is relatively long and parallax can be neglected, or in a camera of the type which can compensate for it, there is a case where a detecting apparatus of the external distance measuring type can be used.

According to the present invention described above, overall judgment is effected not only by the mechanically detected position of the visual axis, but also on the basis of the detection information of a plurality of detection view fields near the position of the visual axis, whereby the focus is adjusted, and this leads to the effect that the maladjustment of the focus by the involuntary minute movement of the photographer's visual axis can be decreased. There is also the effect that a focus adjusting operation of high reliability can be realized even for the movement of the visual axis which will grasp the entire object.

Only the detection view field near the position of the visual axis operates and any other unnecessary focus information than a desired object is intercepted and therefore, for example, the inconvenience that the camera is focused on an undesired object lying at a short distance can be eliminated.

Also, if as shown in the embodiment, the handling of the focus detection output is changed in conformity with the focus adjusting operation mode and for example, in the one shot operation mode, the focus is adjusted to the distance measuring view field at the intermediate distance in a selected distance measuring view field range, and in the servo operation mode, lens driving is effected in accordance with the information of a distance measuring view field which is high in the continuity of the defocus variation, it will be possible to accomplish focus adjustment more conformable to the photographer's intention.

What is claimed is:

1. A camera on which an objective lens is removably mounted or which is provided with a fixed objective lens, comprising:

observation means for observing an object therethrough;

visual axis detecting means for detecting the position of the visual axis of an observer's eye;

a focus detecting apparatus for independently effecting focus detection with respect to a plurality of predetermined detection areas;

means for selecting a plurality of detection areas near the position of the visual axis detected by said visual axis detecting means, said plurality of detection areas being less than the plurality of predetermined detection areas; and electrical means for forming a focus adjustment signal for the objective lens on the basis of detection information of said focus detecting apparatus regarding said selected detection areas.

2. A camera according to claim 1, wherein said electrical means produces the focus adjustment signal in accordance with an operation mode of the camera.

3. A camera on which an objective lens is removably mounted or which is provided with a fixed objective lens, comprising:

observation means for observing an object therethrough;

visual axis detecting means for detecting the position of the visual axis of an observer's eye;

a plurality of observation blocks each having a plurality of detection view fields;

means for selecting one of said blocks in accordance with a result of detection of said visual axis detecting means;

focus detection means for performing a focus detection operation with respect to the detection view fields included in said selected block; and electrical means for forming a focus adjustment signal for the objective lens on the basis of detection information of said focus detection means regarding said detection view fields of said selected blocks.

4. A camera having an objective lens and a servo mode, comprising:

adjusting means for effecting focus adjustment of the objective lens to an object;

visual axis detecting means for detecting a visual axis of an observer of said camera;

focus detecting means for effecting a plurality of focus detections relative to a plurality of different positions in a field of view, respectively;

means for determining (i) a variation in a predicted focusing plane position of said objective lens, and (ii) a variation in a distance from the object to the camera;

mode setting means for causing said visual axis detecting means to detect the visual axis prior to the operation of said focus detecting means when the camera is in the servo mode, the servo mode effecting focus adjustment in accordance with (i) the variation in the predicted focusing plane position of said objective lens and (ii) the variation in the distance of the object determined by said means for determining; and control means for controlling said adjusting means to cause the predicted focusing plane position to be continuously corrected with respect to information of said focus detecting means relative to the focusing plane position according to an output of said visual axis detecting means.

5. A camera comprising:

adjusting means for effecting focus adjustment of an objective lens;

visual axis detecting means for detecting a visual axis of an observer of said camera;

means for determining that an output of said visual axis detecting means is improper;

distance measuring means for effecting a plurality of distance measurements relative to a plurality of different positions in a field of view, respectively; and control means for, when the output of said visual axis detecting means is determined to be improper by said means for determining, controlling said adjusting means on the basis of an output of said distance measuring means relative to the detected visual axis or relative to a previously detected visual axis detected by said visual axis detecting means.

6. A camera comprising:

adjusting means for effecting focus adjustment of an objective lens;

visual axis detecting means for detecting a visual axis of an observer of said camera;

distance measuring means for effecting a plurality of distance measurements relative to a plurality of different positions in a field of view, respectively; and control means having a first operation mode for causing said adjusting means to control a moving direction of a predicted focusing plane position of the objective lens, and a second operation mode for causing said adjusting means to control a moving direction and a movement amount of the predicted focusing plane position, said control means effecting the first operation mode when a distance measurement effected by said distance measuring means is determined to be improper by said means for determining, said control means effecting in a predetermined sequence the detection by said visual axis detecting means and the distance measurement by said distance measuring means during operation of said adjusting means in the first operation mode.

7. A photo-taking apparatus for use with a visual axis detecting means for detecting the visual axis of an observer of said apparatus, said apparatus comprising a processor having (i) a first mode for causing the visual axis detecting means to detect the visual axis of the observer at least one time, and for locking detection information output by said visual axis detecting means; and (ii) a second mode for renewing the detection information output by said visual axis detecting means by repeatedly causing said visual axis detecting means to operate.

8. Apparatus according to claim 8, further comprising setting means for setting a plurality of photo-taking conditions of said apparatus, wherein said first mode and said second mode are switched in accordance with an output of said setting means.

* * * * *

UNITED STATES PATENT AND TRADEMARK OFFICE
CERTIFICATE OF CORRECTION

PATENT NO. : 5,422,700
DATED : June 6, 1995
INVENTOR(S) : YASUO SUDA, et al

It is certified that error appears in the above-indentified patent and that said Letters Patent is hereby corrected as shown below:

Title Page:
At [54] TITLE

"WITHIN A" should read --WITHIN AN--;

At [56] FOREIGN PATENT DOCUMENTS

"1241511 9/1989 Japan
 1288816 11/1989 Japan
 232312 2/1990 Japan" should read
--1-241511 9/1989 Japan
  1-288816 11/1989 Japan
  2-32312 2/1990 Japan--;

Column 1

Line 3, "WITHIN A" should read --WITHIN AN--;
Line 14, "related" should read --relates--; and
Line 22, "Auto focus" should read --Auto-focus--.

Column 2

Line 10, "to" should read --to form--.

Column 4

Line 34, "..." (ellipses) should be deleted; and
Line 48, "cornear" should read --corneal--.

Column 5

Line 68, "ad" should read --and--.

UNITED STATES PATENT AND TRADEMARK OFFICE
CERTIFICATE OF CORRECTION

PATENT NO. : 5,422,700
DATED : June 6, 1995
INVENTOR(S) : Yasuo Suda, et al

It is certified that error appears in the above-indentified patent and that said Letters Patent is hereby corrected as shown below:

Column 9

Line 7, "a EEPROM" should read --an EEPROM--; and
Line 36, "SI synchronism" should read --SI in synchronism--.

Column 10

Line 13, "in" should read --an--.

Column 12

Line 64, "shift" should read --a shift--.

Column 16

Line 25, "NOW," should read --Now,--.

Column 18

Line 4, "whereat-the" should read --whereat the--.

Column 19

Line 67, "executed-once" should read --executed once--.

Column 20

Line 47, "a°" should read --a--.

Column 22

Line 26, "the-infinity" should read --the infinity--.

UNITED STATES PATENT AND TRADEMARK OFFICE
CERTIFICATE OF CORRECTION

PATENT NO. : 5,422,700

DATED : June 6, 1995

INVENTOR(S) : Yasuo Suda, et al

Page 3 of 4

It is certified that error appears in the above-indentified patent and that said Letters Patent is hereby corrected as shown below:

Column 23

Line 30, "discriminating-whether" should read --discriminating whether--; and
Line 35, "and-any" should read --and any--.

Column 24

Line 10, "a-step" should read --a step--;
Line 55, "al-so" should read --also--.

Column 25

Line 4, "AF-is" should read --AF is--;
Line 30, "made-to" should read --made to--;
Line 47, "is-set" should read --is set--; and
Line 58, "reference-to" should read --reference to--.

Column 26

Line 7, "appear" should read --upper--;
Line 9, "(425) (434)" should read --(425)-(434)--; and
Line 40, "land" should read --and--.

UNITED STATES PATENT AND TRADEMARK OFFICE
CERTIFICATE OF CORRECTION

PATENT NO. : 5,422,700
DATED : June 6, 1995
INVENTOR(S) : Yasuo Suda, et al

It is certified that error appears in the above-indentified patent and that said Letters Patent is hereby corrected as shown below:

Column 27

Line 46, "plane-movement" should read --plane movement--.

Signed and Sealed this

Fourteenth Day of November, 1995

Attest:

BRUCE LEHMAN

Attesting Officer    Commissioner of Patents and Trademarks